United States Patent
Yasui

(10) Patent No.: US 8,639,427 B2
(45) Date of Patent: Jan. 28, 2014

(54) MOTION CONTROL DEVICE FOR VEHICLE

(75) Inventor: Yoshiyuki Yasui, Nagoya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 521 days.

(21) Appl. No.: 12/850,191

(22) Filed: Aug. 4, 2010

(65) Prior Publication Data

US 2011/0035129 A1    Feb. 10, 2011

(30) Foreign Application Priority Data

Aug. 5, 2009  (JP) ................................. 2009-182826
Aug. 5, 2009  (JP) ................................. 2009-182864

(51) Int. Cl.
*G06F 19/00*    (2011.01)

(52) U.S. Cl.
USPC .......................................................... 701/70

(58) Field of Classification Search
USPC .......... 701/70, 71, 72, 78, 79, 82, 83, 91, 300, 701/301
See application file for complete search history.

(56) References Cited

U.S. PATENT DOCUMENTS

| | | | |
|---|---|---|---|
| 5,540,298 A * | 7/1996 | Yoshioka et al. ............. 180/169 |
| 6,157,892 A * | 12/2000 | Hada et al. ..................... 701/301 |
| 6,272,418 B1 * | 8/2001 | Shinmura et al. ............... 701/72 |
| 6,289,281 B1 * | 9/2001 | Shinmura et al. ............. 701/301 |
| 6,553,297 B2 * | 4/2003 | Tashiro et al. .................. 701/48 |
| 6,622,074 B1 * | 9/2003 | Coelingh et al. ................ 701/48 |
| 6,735,510 B2 * | 5/2004 | Hac ................................. 701/70 |
| 6,873,891 B2 * | 3/2005 | Moser et al. .................... 701/48 |
| 6,889,140 B2 | 5/2005 | Isogai et al. |
| 7,016,783 B2 * | 3/2006 | Hac et al. ....................... 701/301 |
| 7,035,726 B2 * | 4/2006 | Sakata ............................. 701/72 |

(Continued)

FOREIGN PATENT DOCUMENTS

| | | |
|---|---|---|
| JP | 10-250548 A | 9/1998 |
| JP | 11-211492 A | 8/1999 |

(Continued)

OTHER PUBLICATIONS

Japanese Official Action dated May 14, 2013 issued in the corresponding Japanese Patent Application No. 2009-182826 and English language translation.

(Continued)

*Primary Examiner* — Khoi Tran
*Assistant Examiner* — Adam Mott
(74) *Attorney, Agent, or Firm* — Buchanan Ingersoll & Rooney PC

(57) ABSTRACT

A motion control device for a vehicle includes a braking means for applying a brake torque to each of a plurality of wheels of the vehicle, an avoidance control means for calculating a first target quantity, used for an avoidance control for applying the brake torque to each wheel via the braking means in order to avoid an emergency state of the vehicle, a stabilization control means for determining a target wheel, to which the brake torque is applied, out of the wheels and calculating a second target quantity used for a stabilization control for applying the brake torque to the target wheel in order to ensure a vehicle stability, and a brake control means for controlling the brake torque applied to a non-target wheel based on the first target quantity and controlling the brake torque applied to the target wheel based on the first and second target quantities.

1 Claim, 10 Drawing Sheets

(56) References Cited

U.S. PATENT DOCUMENTS

| | | | |
|---|---|---|---|
| 7,065,442 B2* | 6/2006 | Sakata | 701/72 |
| 7,079,930 B2* | 7/2006 | Gerdes | 701/48 |
| 7,213,892 B2 | 5/2007 | Kato et al. | |
| 7,729,840 B2* | 6/2010 | Nishira et al. | 701/70 |
| 7,844,384 B2* | 11/2010 | Seto | 701/96 |
| 8,204,634 B2* | 6/2012 | Schwarz et al. | 701/1 |
| 2002/0010535 A1 | 1/2002 | Nishio | |
| 2004/0193374 A1* | 9/2004 | Hac et al. | 701/301 |
| 2005/0096827 A1* | 5/2005 | Sadano et al. | 701/70 |
| 2005/0125153 A1* | 6/2005 | Matsumoto et al. | 701/300 |
| 2005/0209762 A1* | 9/2005 | Lu et al. | 701/70 |
| 2007/0129891 A1* | 6/2007 | Yano et al. | 701/301 |
| 2007/0150116 A1* | 6/2007 | Schwarz et al. | 701/1 |
| 2008/0208426 A1* | 8/2008 | Iwasaki et al. | 701/70 |
| 2008/0281521 A1* | 11/2008 | Shirato | 701/301 |
| 2009/0012684 A1* | 1/2009 | Thiele | 701/70 |
| 2012/0065861 A1* | 3/2012 | Hartmann et al. | 701/71 |

FOREIGN PATENT DOCUMENTS

| | | |
|---|---|---|
| JP | 2002-37047 A | 2/2002 |
| JP | 2004-259151 A | 9/2004 |
| JP | 2005-35444 A | 2/2005 |
| JP | 2005-059655 A | 3/2005 |
| JP | 2005-170328 A | 6/2005 |
| JP | 2005-289205 A | 10/2005 |

OTHER PUBLICATIONS

Japanese Official Action dated May 14, 2013 issued in the corresponding Japanese Patent Application No. 2009-182864 and English language translation.

* cited by examiner

F I G. 10
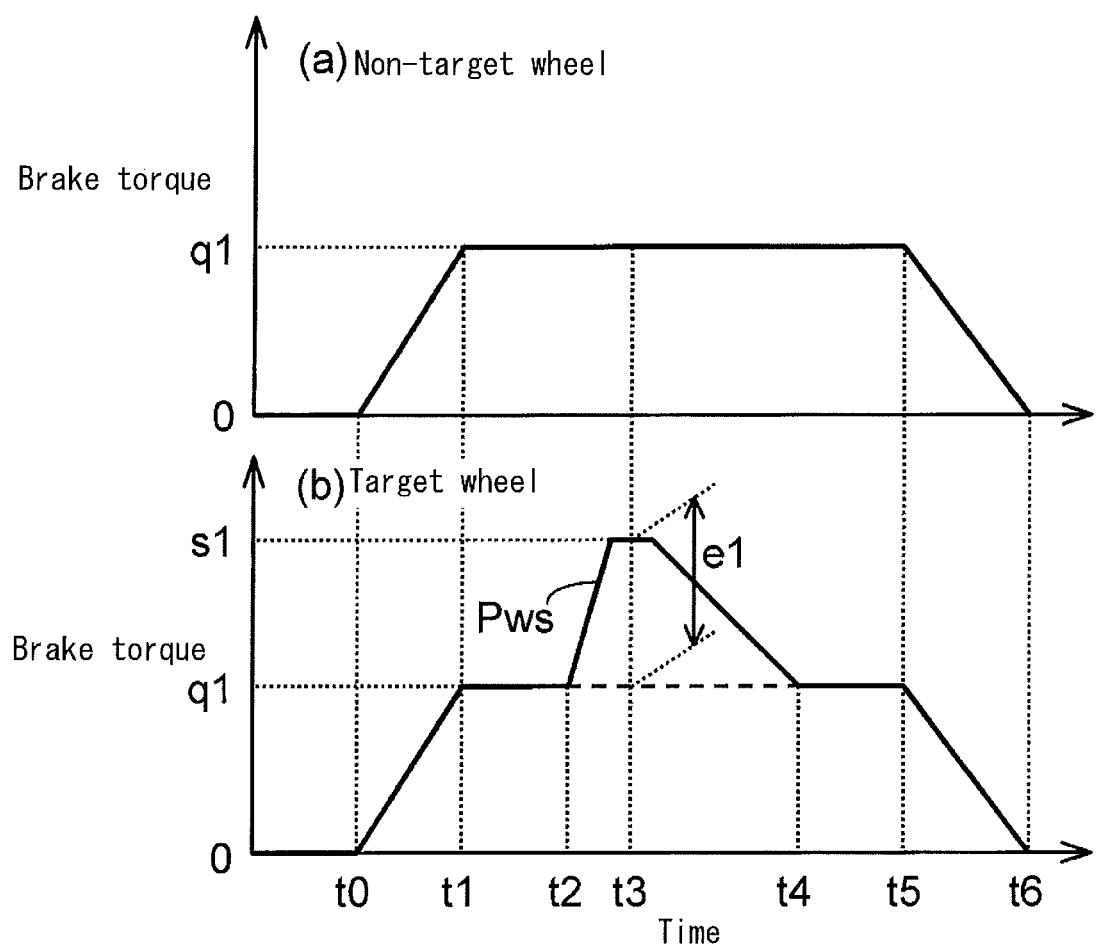

MOTION CONTROL DEVICE FOR VEHICLE

CROSS REFERENCE TO RELATED APPLICATIONS

This application is based on and claims priority under 35 U.S.C. §119 to Japanese Patent Application 2009-182826, filed on Aug. 5, 2009, Japanese Patent Application 2009-182864, filed on Aug. 5, 2009, the entire contents of which are incorporated herein by reference.

FIELD OF THE INVENTION

The present invention generally relates to a motion control device for a vehicle.

BACKGROUND

Disclosed in JP2004-259151A is a collision avoidance control system for a vehicle, which executes a collision avoidance control for avoiding a collision of the vehicle against a target object while accurately determining a possibility of the collision and calculating a control amount for avoiding the collision with less calculation in a manner where the collision avoidance control system selects the target object (e.g. a vehicle traveling ahead of the subject vehicle having the collision avoidance control system) to be subjected to the control on the basis of an information received from a radar sensor, each electronic control unit (ECU) and the like, obtains a collision avoidance deceleration necessary for decelerating the subject vehicle so that a relative speed between the target object and the subject vehicle becomes zero (0), by which the collision of the subject vehicle against the target object is avoidable, and generates a braking force based on the collision avoidance deceleration.

Disclosed in JPH11-211492A is a road information recognition system that calculates a first road information on the basis of a data stored within a navigation device, calculates a second road information on the basis of a data obtained by an image capture device, and compares a curvature radius of a curve and the like based on the first road information with a curvature radius of the curve and the like based on the second road information. Then, the road information recognition system disclosed in JPH11-211492A sets the curvature radius of the curve and the like in a case where the curvature radius of the curve based on the first road information, the curvature radius of the curve based on the second road information and the like satisfy predetermined conditions in order to detect a detailed, accurate and reliable information relating to a road extending ahead of a vehicle. Furthermore, the road information recognition system disclosed in JPH11-211492A executes a braking operation and the like on the basis of the information relating to the curvature radius of the curve and the like in a case where the vehicle needs to be forcibly decelerated.

Disclosed in JP2005-289205A is a motion control device for a vehicle, which is configured so as to select either a deceleration control (an avoidance control) or a turning control (a stabilization control) depending on a driving situation in order to restrict an interference in the control occurring when the turning control (the stabilization control) for restricting an understeering tendency and an oversteering tendency is started while the deceleration control (the avoidance control) is being executed. More specifically, in the deceleration control (the avoidance control), a deceleration control quantity for decelerating the vehicle is calculated and a wheel braking force is controlled on the basis of the deceleration control quantity. In the turning control (the stabilization control), a second deceleration control quantity for decelerating the vehicle is calculated and the wheel braking force is controlled on the basis of the second deceleration control quantity in a case where the understeering tendency occurs at the vehicle (i.e. an understeering restriction control). On the other hand, in a case where the oversteering tendency occurs at the vehicle, a yaw moment control quantity for generating a yaw moment at the vehicle in a turning outer direction is calculated and the wheel braking force is controlled on the basis of the yaw moment control quantity (i.e. an oversteering restriction control). Then, in the case where the understeering tendency is occurring at the vehicle, either the deceleration control quantity of the deceleration control (the avoidance control) or the second deceleration control quantity of the turning control (the stabilization control) having a greater value is selected, so that the wheel braking force is controlled on the basis of the deceleration control quantity of the deceleration control or the second deceleration control quantity having the greater value in order to avoid an occurrence of the interference in the controls between the deceleration control (the avoidance control) and the turning control (the stabilization control). On the other hand, in the case where the oversteering tendency is occurring at the vehicle, the wheel braking force is controlled on the basis of the yaw moment control quantity of the turning control (the stabilization control).

The collision avoidance control for avoiding the collision of the vehicle against the target object existing in front of the subject vehicle (e.g. the vehicle traveling in front of the subject vehicle) on the basis of an information relating to a distance between the subject vehicle and the target object (JP2004-259151A) and a departure avoidance control for decelerating the vehicle on the basis of the information relating to the curve of the road existing ahead of the vehicle so that the vehicle does not depart from the curve (JPH11-211492A) are referred to as an emergency avoidance control (which is also referred to simply as an avoidance control) for avoiding an emergency state of the vehicle by decelerating the vehicle. As disclosed in JP2005-289205A, in the case where either one of the avoidance control and the stabilization control is selected when the execution conditions of the avoidance control and the stabilization control are both satisfied and then the control (the braking control) is simply switched between the avoidance control and the stabilization control, the vehicle may not be sufficiently decelerated, or the vehicle may not be sufficiently stabilized.

More specifically, the following drawbacks may occur. Firstly, a case where the understeering tendency occurs at the vehicle while the deceleration control (the avoidance control) is being executed and a start of the turning control (the stabilization control) is determined will be considered below. In this case, the understeering tendency of the vehicle needs to be resolved. However, in a case where the deceleration control quantity of the deceleration control is greater than the second deceleration control quantity of the turning control and the deceleration control quantity of the deceleration control is selected, the deceleration control is kept being executed. As a result, the understeering tendency of the vehicle is not resolved, because the understeering restriction control is not executed.

Secondly, a case where the oversteering tendency occurs at the vehicle while the deceleration control (the avoidance control) is being executed and a start of the turning control (the stabilization control) is determined will be considered below. In this case, the control quantity used for the control of the wheel braking force is suddenly switched from the deceleration control quantity of the deceleration control to the yaw moment control quantity of the turning control. As a result, a sudden change may occur at a total wheel braking force when the control is switched. In this case, a driver may feel discomfort.

A need thus exists to provide a motion control device for a vehicle in which an interference in controls between an emergency avoidance control (an avoidance control) for avoiding an emergency state of the vehicle (e.g. a departure of the vehicle from a road, a collision of the vehicle against a vehicle traveling ahead of the subject vehicle and the like) and a stabilization control for appropriately maintaining a steering characteristic of the vehicle is avoided in order to achieve a smooth braking control. Furthermore, a need thus exists to provide the motion control device for the vehicle in which the emergency avoidance control and the stabilization control are achieved with a simple system architecture (e.g. a brake configuration that does require to provide a brake hydraulic pressure sensor at each wheel and the like).

SUMMARY OF THE INVENTION

According to an aspect of the present invention, a motion control device for a vehicle includes a braking means for applying a brake torque to each of a plurality of wheels of the vehicle, an avoidance control means for calculating a first target quantity, which is used for an avoidance control for applying the brake torque to each of the plurality of the wheels via the braking means in order to avoid an emergency state of the vehicle, a stabilization control means for determining a target wheel out of the plurality of the wheels as a target of a supply of the brake torque and calculating a second target quantity used for a stabilization control for applying the brake torque to the target wheel via the braking means in order to ensure a stability of the vehicle, and a brake control means for controlling the brake torque to be applied to a non-target wheel, which differs from the target wheel, on the basis of the first target quantity and controlling the brake torque to be applied to the target wheel on the basis of the first target quantity and the second target quantity.

According to a further aspect of the present invention, a motion control device for a vehicle includes a braking means for applying a brake torque to each of a plurality of wheels of the vehicle, an avoidance control means for calculating a first target quantity and a first actual quantity, which are used for an avoidance control for applying the brake torque to each of the plurality of the wheels via the braking means in order to avoid an emergency state of the vehicle, a stabilization control means for determining a target wheel out of the plurality of the wheels as a target of a supply of the brake torque and calculating a second target quantity used for a stabilization control for applying the brake torque to the target wheel via the braking means in order to ensure a stability of the vehicle, and a brake control means for calculating the brake torque to be applied to a non-target wheel, which differs from the target wheel, on the basis of the first target quantity corresponding to the non-target wheel and calculating the brake torque to be applied to the target wheel on the basis of the first actual quantity corresponding to the non-target wheel and the second target quantity corresponding to the target wheel.

According to a further aspect of the present invention, a motion control device for a vehicle includes a braking means for applying a brake torque to each of a plurality of wheels of the vehicle, an avoidance control means for calculating a target deceleration used for an avoidance control for avoiding an emergency state of the vehicle by applying the brake torque to each of the plurality of the wheels via the braking means, a stabilization control means for determining a target wheel out of the plurality of the wheels as a target of a supply of the brake torque and calculating a target slip velocity used for a stabilization control for ensuring a stability of the vehicle by applying the brake torque to the target wheel via the braking means, and a brake control means for controlling the braking means on the basis of the target deceleration and the target slip velocity, wherein the motion control device for the vehicle further includes a wheel speed obtaining means for obtaining an actual speed of each of the plurality of the wheels, and the brake control means controls the brake torque to be applied to a non-target wheel, which differs from the target wheel, on the basis of the target deceleration and controls the brake torque to be applied to the target wheel on the basis of the target slip velocity corresponding to the target wheel and the actual speed of the wheel corresponding to the non-target wheel.

BRIEF DESCRIPTION OF THE DRAWINGS

The foregoing and additional features and characteristics of the present invention will become more apparent from the following detailed description considered with the reference to the accompanying drawings, wherein:

FIG. 10 is a time series graph for explaining advantages and merits of the motion control device for the vehicle according to the second embodiment.

DETAILED DESCRIPTION

Embodiments of a motion control device for a vehicle will be described below.

First Embodiment

Figure 1:
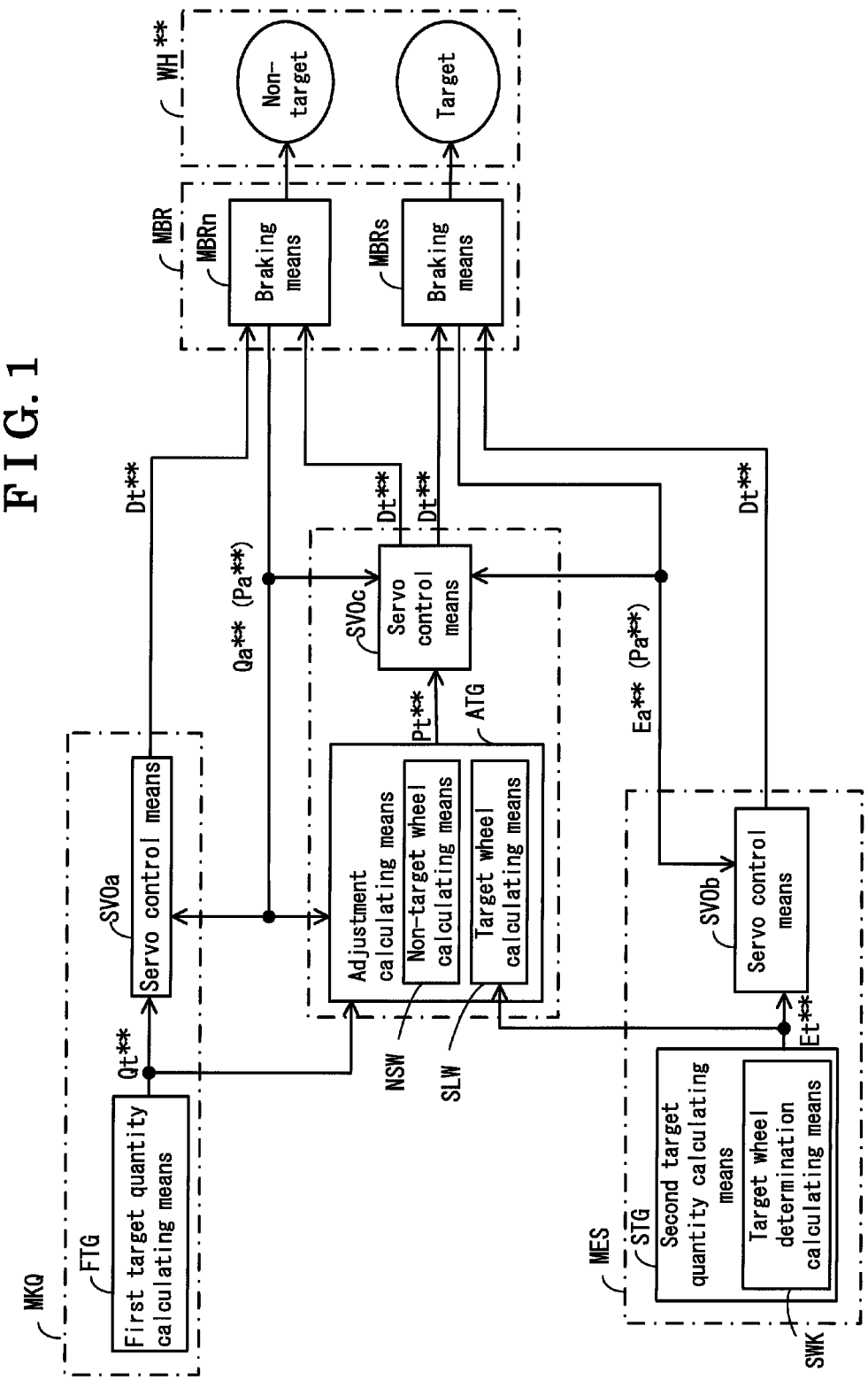
FIG. 1 is a diagram illustrating an entire configuration of a motion control device for a vehicle according to a first embodiment.

Illustrated in FIG. 1 is an entire configuration of a motion control device (which will be hereinafter referred to simply as a device) according to a first embodiment. The device includes a braking means MRB, an avoidance control means MKQ, a stabilization control means MES, and a brake control means MBC.

Each wheel WH includes a known wheel cylinder WC, a known brake caliper BC, a known brake pad PD and a known brake rotor RT as the braking means MBR. A brake torque is applied to each wheel WH in a manner where the brake pad PD is pressed against the brake rotor RT when a brake hydraulic pressure is applied to the wheel cylinder WC, which is provided at the brake caliper BC, so that a friction force generated when the brake pad PD is pressed against brake rotor RT acts on the wheel WH as the brake torque. The braking means MBR includes hydraulic pressure pumps OP1 and OP2, and electromagnetic valves SS, SZ and SG for controlling the brake hydraulic pressure. In this embodiment, the brake torque is controlled by the brake hydraulic pressure. Alternatively, the control of the brake torque may be achieved by using an electric brake apparatus.

The breaking means MBR includes a means for obtaining an actual quantities Pa, Qa and Ea, which correspond to the brake torque actually applied to the wheel WH. More specifically, the device includes at least one of a hydraulic pressure sensor for detecting the brake hydraulic pressure, a torque sensor for detecting a shaft torque of the wheel WH and a force sensor for detecting a pressing force of the brake pad PD, so that the braking means MBR calculates the actual quantities Pa, Qa and Ea on the basis of an output from at least one of the hydraulic pressure sensor, the torque sensor and the force sensor. The actual quantities Pa, Qa and Ea may be calculated on the basis of a wheel speed Vw, because a wheel slip occurs at the wheel WH in response to the brake torque applied thereto and a wheel braking force is generated at the wheel WH. Alternatively, the actual quantities Pa, Qa and Ea may be calculated on the basis of actuation states (electrification states) of the hydraulic pressure pumps OP1 and OP2 and the electromagnetic valves SS, SZ and SG**.

The avoidance control means MKQ includes a first target quantity calculating means FTG and a servo control means SVOa. A first target quantity Qt, which serves as a target quantity corresponding to a brake torque in the avoidance control, is calculated at the first target quantity calculating means FTG. A drive signal Dt for controlling the braking means MBRn (the braking means which is not selected as a subject to be controlled in the stabilization control but is targeted to an execution of the avoidance control) is generated at the servo control means SVOa on the basis of the first target quantity Qt and a first actual quantity Qa.

The stabilization control means MES includes a second target quantity calculating means STG, a target wheel determination calculating means SWK and a servo control means SVOb. A wheel (a target wheel) to which the brake torque is to be applied in order to maintain a stability of the vehicle is determined out of four wheels, which are arranged at front, rear, left and right sides of the vehicle, respectively, at the target wheel determination calculating means SWK. A second target quantity Et, which serves as a target quantity corresponding to the brake torque applied to the selected wheel (the target wheel) in the stabilization control, is calculated at the second target quantity calculating means STG. A drive signal Dt for controlling the braking means MBRs (the braking means of the target wheel) is generated at the servo control means SVOb on the basis of the second target quantity Et and a second actual quantity Ea.

The brake control means MBC is actuated in a case where the avoidance control and the stabilization control are simultaneously executed. For example, the brake control means MBC functions in a case where the stabilization control is started due to an inappropriate steering operation performed by a driver while the avoidance control is being executed and the vehicle is decelerated accordingly. The brake control means MBC includes a (target quantity) adjustment calculating means ATG and a servo control means SVOc. Furthermore, the adjustment calculating means ATG includes a non-target wheel calculating means NSW and a target wheel calculating means SLW, so that the first target quantity Qt and the second target quantity Et are adjusted thereat in order to calculate a final target quantity Pt**.

The target quantity Pt to be applied to the braking means MBRn of the non-target wheel (the wheel differing from the wheel that is determined by the target wheel determination calculating means SWK as the target to which the brake torque is to be applied) is calculated at the non-target wheel calculating means NSW on the basis of the first target quantity Qt of the non-target wheel. On the other hand, the target quantity Pt to be applied to the braking means MBRs of the target wheel (the wheel that is determined by the target wheel determination calculating means SWK as the target to which the brake torque is to be applied) is calculated at the target wheel calculating means SLW on the basis of the first target quantity Qt of the target wheel and the second target quantity Et of the target wheel. For example, the target quantity Pt, which is obtained as a result of the adjustment to the first target quantity Qt and the second target quantity Et, may be calculated by adding the first target quantity Qt of the target wheel to the second target quantity Et of the target wheel.

Alternatively, the target quantity Pt to be applied relative to the braking means MBRs of the target wheel is calculated at the target wheel calculating means SLW on the basis of the actual quantity Qa of the non-target wheel and the target quantity Et of the target wheel. For example, the target quantity Pt, which is obtained as the result of the adjustment of the first target quantity Qt and the second target quantity Et, may be calculated by adding the actual quantity Qa of the non-target wheel to the target quantity Et of the target wheel. The drive signal Dt for controlling the braking means MBR (the braking means MBRn and the braking means MBRs) is generated at the servo control means SVOc on the basis of the target quantity Pt and the actual quantity Pa. The braking means MBR is controlled on the basis of the drive signal Dt and applies the brake torque to the wheel WH**.

Figure 2:
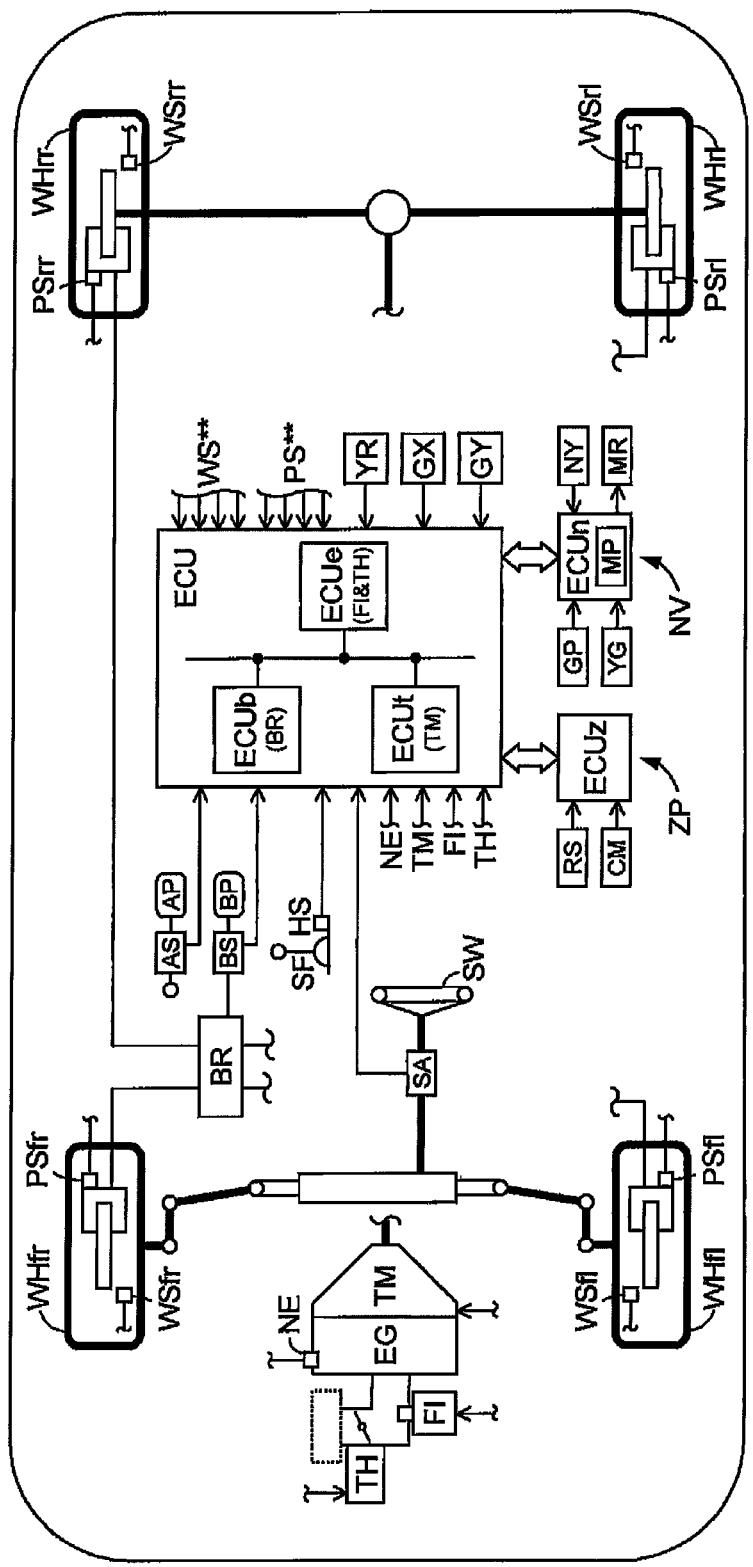
FIG. 2 is a diagram illustrating an entire configuration of the vehicle having the motion control device for the vehicle according to the first embodiment.

Illustrated in FIG. 2 is an entire configuration of the vehicle having the motion control device of the vehicle (the device) according to the first embodiment.

The device includes an engine EG, which serves as a power source of the vehicle, a brake actuator BR, an electronic control unit ECU, a navigation device NV and a forward monitoring device ZP.

For example, an internal combustion engine is adapted as the engine EG. An opening degree of a throttle valve TV of the engine EG is controlled by means of a throttle actuator TH in response to an operation of an acceleration pedal AP (an acceleration operating member) by the driver. Fuel is injected by means of a fuel injection actuator FI (an injector) in proportion to an intake air volume, which is adjusted in response to the opening degree of the throttle valve TV. Accordingly, an output torque in response to the operation of the acceleration pedal AP by the driver is obtained.

The brake actuator BR has a configuration in which plural electromagnetic valves, a hydraulic pump, a motor and the like are included. The brake actuator BR supplies a brake pressure (a brake hydraulic pressure) in response to an operation of a brake pedal BP (a brake operating member) by the driver to a wheel cylinder WC of each wheel WH in a case where a brake control is not executed. Furthermore, the brake actuator BR is configured to individually adjust the brake hydraulic pressure within the wheel cylinder WC of each wheel WH independently of the operation of the brake pedal BP (and the operation of the acceleration pedal AP) in a case where the brake control is executed.

Additionally, symbols '' are used to comprehensively indicate wheels, specifically, 'fl' indicates a relation to a front-left wheel, 'fr' indicate a relation to a front-right wheel, 'rl' indicates a relation to a rear-left wheel, and 'rr' indicates a relation to a rear-right wheel. For example, the wheel cylinder WC comprehensively indicates a front-left wheel cylinder WCfl, a front-right wheel cylinder WCfr, a rear-left wheel cylinder WCrl and a rear-right wheel cylinder WCrr.

The device includes a wheel speed sensor WS for detecting the wheel speed Vw of the wheel WH, a brake hydraulic pressure sensor PS for detecting a brake hydraulic pressure Psa within the wheel cylinder WC, a steering wheel angle sensor SA for detecting a rotational angle θsw of a steering wheel SW (from a neutral position), a yaw rate sensor YR for detecting a yaw rate Yra acting on a vehicle body, a longitudinal acceleration sensor GX for detecting an acceleration (a deceleration) Gxa generated in a front-rear direction (a longitudinal direction) of the vehicle body, a lateral acceleration sensor GY for detecting a lateral acceleration Gya generated in a lateral direction of the vehicle body, an engine rotational speed sensor NE for detecting a rotational speed Ne of an output shaft of the engine EG, an acceleration operation sensor AS for detecting an operation quantity As of the acceleration pedal AP, a brake operation sensor BS for detecting an operation quantity Bs of the brake pedal BP, and a throttle valve opening degree sensor TS for detecting an opening degree Ts of the throttle valve TV.

The electronic control unit ECU is a microcomputer that electronically controls a powertrain system and a chassis system. The electronic control unit ECU is electrically connected to the above-mentioned various actuators and various sensors. Alternatively, the electronic control unit ECU communicates with each of the above-mentioned various actuators and various sensors via a network. The electronic control unit ECU is configured with plural control units (ECUb and the like), which are connected to each other by means of a communication bus CB.

The control unit ECUb within the electronic control unit ECU serves as a wheel brake control unit ECUb. More specifically, the wheel brake control unit ECUb controls the brake actuator BR on the basis of signals outputted from the wheel speed sensor WS, the longitudinal acceleration sensor GX, the lateral acceleration sensor GY, the yaw rate sensor YR and the like. The wheel brake electronic control unit ECUb is configured so as to execute a brake torque control (a brake hydraulic pressure control) such as the stabilization control for properly maintaining a steering characteristic of the vehicle (i.e. an understeering characteristic, an oversteering characteristic), the emergency avoidance control for decelerating the vehicle in order to avoid an emergency state of the vehicle, an anti-skid control (ABS control), a traction control (TCS control) and the like. Additionally, the wheel brake control unit ECUb calculates an actual vehicle speed (a vehicle speed) Vxa on the basis of the wheel speed Vw, which is a detection result of the wheel speed sensor WS**.

A control unit ECUe within the electronic control unit ECU serves as an engine control unit ECUe. More specifically, the engine control unit ECUe executes an output torque control (i.e. an engine control) of the engine EG in which the engine control unit ECUe controls the throttle actuator TH and the fuel injection actuator FI on the basis of a signal outputted from the acceleration operation sensor AS and the like.

The navigation device NV includes an electronic control unit ECUn for navigation processing. Furthermore, the electronic control unit ECUn includes a storage portion MP. The electronic control unit ECUn of the navigation device NV is electrically connected to a vehicle position detecting means GP (a global positioning system), a yaw rate gyro YG, an input portion NY and a display portion MR (a display). The navigation device NV (the electronic control unit ECUn) is electrically connected to the electronic control unit ECU. Alternatively, the navigation device NV is configured so as to communicate with the electronic control unit ECU via a wireless network.

The vehicle position detecting means GP detects a position (a latitude, a longitude and the like) of the vehicle by using a known method using a positioning signal outputted from a satellite. The yaw rate gyro YG detects a yaw angular acceleration (the yaw rate) of the vehicle body. The input portion NY inputs an operation relating to a navigation function by the driver. The storage portion MP stores therein various information such as a map information, a road information and the like. The electronic control unit ECUn comprehensively processes signals outputted from the vehicle position detecting means GP, the yaw rate gyro YG, the input portion NY and the storage portion MP. Then, the electronic control unit ECUn displays a processing result (i.e. information relating to the navigation function) on the display portion MR.

The forward monitoring device ZP includes an electronic control unit ECUz for monitoring view expanding ahead of the vehicle. More specifically, the electronic control unit ECUz is electrically connected to a radar sensor RS and a camera CM (a forward monitoring camera). The forward monitoring device ZP (the electronic control unit ECUz) is electrically connected to the electronic control unit ECU. Alternatively, the forward monitoring device ZP is configured so as to communicate with the electronic control unit ECU via a wireless network.

The radar sensor RS scan-emits a laser beam (or a radio wave such as a millimeter wave and the like) to a predetermined angular range in the vehicle width direction towards an obstacle (e.g. a vehicle traveling ahead of the subject vehicle) existing in front of the vehicle and receives a reflection. The forward monitoring electronic control unit ECUz detects whether or not the obstacle exists, an angle between the obstacle and the vehicle and a distance between the vehicle and the obstacle on the basis of the received reflection. The camera CM obtains an image expanding ahead of the vehicle. The forward monitoring electronic control unit ECUz determines whether or not the obstacle (e.g. the vehicle traveling ahead of the subject vehicle) exists in front of the vehicle, calculates a distance between the vehicle and the obstacle, and calculates a curvature radius of a curve existing ahead of the vehicle on the basis of the image captured by the camera CM.

Figure 3:
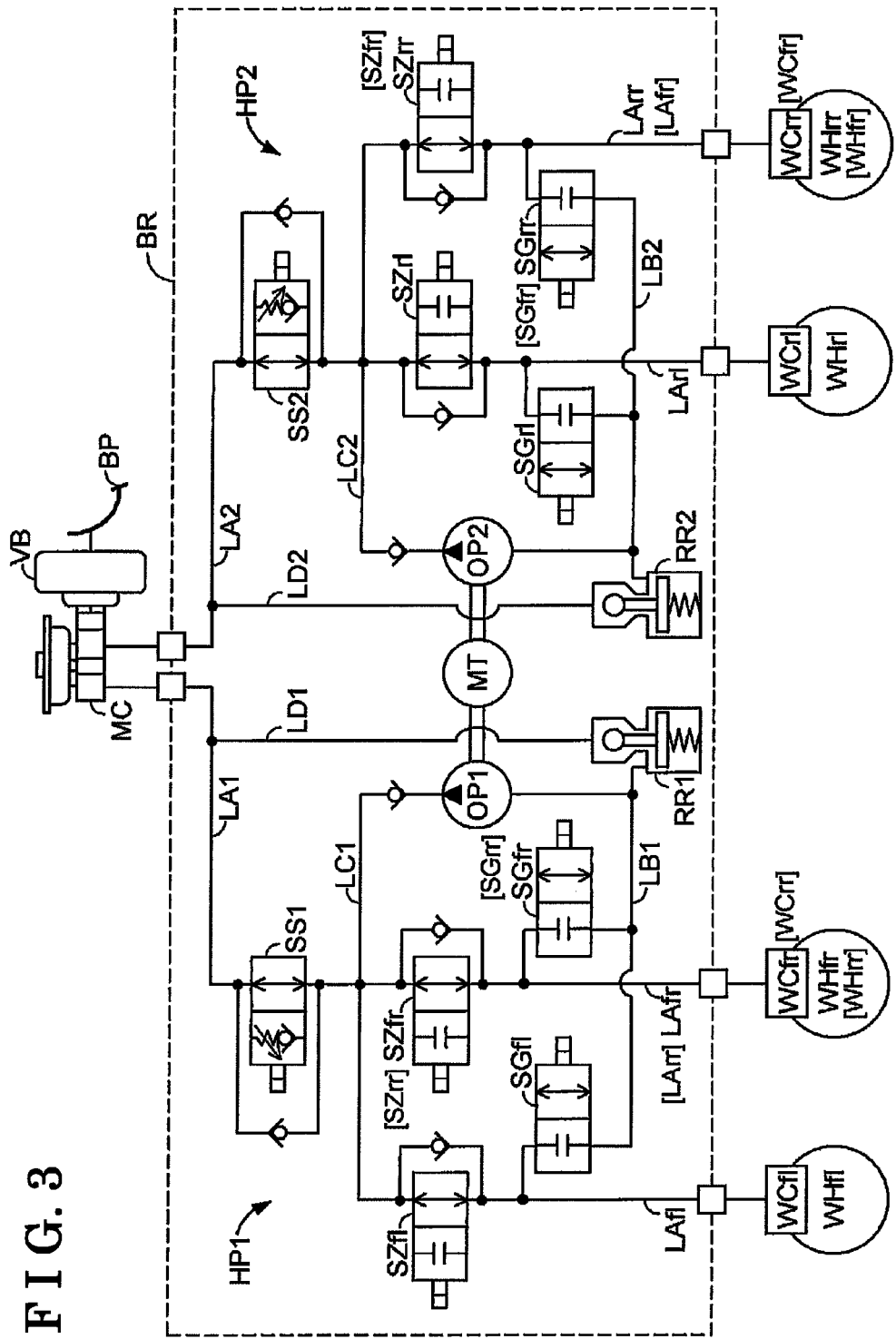
FIG. 3 is a diagram illustrating an entire configuration of a brake actuator illustrated in FIG. 2.

Illustrated in FIG. 3 is an entire configuration of the brake actuator BR. A master cylinder MC generates the brake hydraulic pressure in response to the operation performed by the driver of the vehicle. More specifically, when the driver depresses the brake operating member BP (e.g. the brake pedal BP), a depression force is boosted by means of a booster VB and a master piston provided within the master cylinder MC is pressed by the boosted depression force. Accordingly, the same level of a master cylinder pressure Pmc is generated at each of a first chamber and a second chamber, which are defined by the master piston. The master cylinder pressure Pmc is applied to the wheel cylinder WC of each wheel WH via the brake actuator BR.

The brake actuator BR includes a first brake circuit HP1 (i.e. a first hydraulic pressure circuit system) connected to the first chamber of the master cylinder MC and a second brake circuit HP2 (a second hydraulic pressure circuit system) connected to the second chamber of the master cylinder MC. Additionally, the first brake circuit HP1 (including hydraulic conduits LA1, LB1, LC1, LD1 and the like) and the second brake circuit HP2 (including hydraulic conduits LA2, LB2, LC2, LD and the like) are hydraulically separated. The first brake circuit HP1 (including the conduit LC1 and the like) connects the master cylinder MC with two wheel cylinders out of four wheel cylinders WC** (e.g. the wheel cylinders provided at the front-right wheel and the front-left wheel, respectively) so that a brake fluid flows therebetween. More specifically, the first brake circuit HP1 transmits the brake hydraulic pressure (which is also referred to as the hydraulic pressure) applied to the front wheels WHfr and WHfl. On the other hand, the second brake circuit HP2 (the conduit LC2 and the like) connects the master cylinder MC with the other (remaining) two wheel cylinders, which differ from the wheel cylinders connected to the master cylinder MC by the first brake circuit HP1, (e.g. the wheel cylinders provided at the rear-right wheel and the rear-right wheel, respectively) so that the brake fluid flows therebetween. More specifically, the second brake circuit HP2 transmits the brake hydraulic pressure applied to the rear wheels WHrr and WHrl. Additionally, the first brake circuit HP1 and the second brake circuit HP2 have a similar configuration.

Additionally, the reference numerals "1" and "2" added to the reference alphabets indicating components in FIG. 3 indicate a relation to either the first brake circuit HP1 (the first hydraulic brake circuit system) or the second brake circuit HP2 (the second hydraulic brake circuit system). More specifically, the reference numeral "1" indicates that the relation to the first brake circuit HP1 (the first hydraulic brake circuit system) and the reference numeral "2" indicates that the relation to the second brake circuit HP2 (the second hydraulic brake circuit system). Additionally, a reference symbol "#" is used to comprehensively indicate the first brake circuit HP1 and the second brake circuit HP2.

The first brake circuit HP1 (the first hydraulic brake circuit system) includes the conduit LA1, through which the brake hydraulic pressure (i.e. hydraulic pressures within the wheel cylinders) is generated at each of the wheel cylinders WCfl and WCfr. A first differential pressure control valve SS1 (which is also referred to as an intake valve), which is controlled to be in a communication state and a differential pressure generating state, is provided at the conduit LA1. For example, in a case where the first differential pressure control valve SS1 is in the communication state, the brake fluid flows through the conduit LA1 without generating a differential pressure, in other words, a degree (a level) of the hydraulic pressure at the conduit LA1 at an upstream side relative to the first differential pressure control valve SS1 remains to be at the same level as the hydraulic pressure at the conduit LA1 at a downstream side relative to the first differential pressure control valve SS1. On the other hand, in a case where the first differential pressure control valve SS1 is in the differential pressure generating state, a pressure difference is generated between the hydraulic pressure within the conduit LA1 at the upstream side relative to the first differential pressure control valve SS1 and the hydraulic pressure at the conduit LA1 at the downstream side relative to the first differential pressure control valve SS1. A valve position of the first differential pressure control valve SS1 is controlled to be in the communication state (i.e. an open position) in a case where a normal brake operation accompanying the operation of the brake pedal BP by the driver is performed (i.e. in the case where the brake control is not executed). Accordingly, the master cylinder pressure Pmc is transmitted to the wheel cylinders WCfl and WCfr, which are provided at the front-left wheel WHfl and the front-right wheel WHfr, respectively, via the conduit LA1. The valve position of the first differential pressure control valve SS1 is controlled to be at in the differential pressure generating state from the communication state when electricity is supplied to the first differential pressure control valve SS1. In other words, a pressure difference (i.e. a differential pressure) between the hydraulic pressure at the conduit LA1 and the hydraulic pressure at the conduit LC1 is controlled by controlling an electrification state (i.e. an electric current value, a voltage duty and the like) of the first differential pressure control valve SS1.

The conduit LA1 is split into a first conduit LAfl and a second conduit LAfr at a downstream side closer to the wheel cylinders WCfl and WCfr relative to the first differential pressure control valve SS1. A first pressure increase control valve SZfl (which is also referred to as an inlet valve) for controlling an increase of the brake hydraulic pressure supplied to the wheel cylinder WCfl is provided at the first conduit LAfl. A second pressure increase control valve SZfr for controlling an increase of the brake hydraulic pressure supplied to the wheel cylinder WCfr is provided at the second conduit LAfr. A two position electromagnetic valve, which is controlled to be in a communication establishing state (i.e. a state where the brake fluid is allowed to flow through the two position electromagnetic valve, an open position) and a communication interrupting state (i.e. a state where the flow of the brake fluid is interrupted, a closed position), is adapted to each of the first and second pressure increase control valves SZfl and SZfr. Furthermore, each of the first and second pressure increase control valves SZfl and SZfr is configured as a so-called normally-open type valve. More specifically, in a case where an electric current supplied to each of the first and second pressure increase control valves SZfl and SZfr is zero (0), in other words, in a case where the electricity is not supplied to each of the first and second pressure increase control valves SZfl and SZfr, the communication establishing state is established (i.e. each of the first and second pressure increase control valves SZfl and SZfr is controlled so that a valve thereof is at the open position). On the other hand, in a case where the electric current is supplied to each of the first and second pressure increase control valves SZfl and SZfr, in other words, in a case where each of the first and second pressure increase control valves SZfl and SZfr is electrified, the communication interrupting state is established (i.e. each of the first and second pressure increase control valves SZfl and SZfr is controlled so that the valve thereof is at the closed position). Accordingly, an increase state of the brake hydraulic pressure at each of the wheel cylinders WCfl and WCfr is adjusted in response to a control of an electrification state (i.e. the electric current value, a voltage value and the like) of each of the first and second pressure increase control valves SZfl and SZfr. More specifically, the hydraulic pressure at each of the wheel cylinders WCfl and WCfr is gradually increased up to a pressure level corresponding to the hydraulic pressure at the conduit LC1 by alternately switching each of the first and second pressure increase control valves SZfl and SZfr between the communication state (the open position) and the communication interrupting state (the closed position). Furthermore, the increase of the hydraulic pressure at each of the wheel cylinders WCfl and WCfr is interrupted by retaining each of the first and second pressure increase control valves SZfl and SZfr at the communication interrupting state (the closed position).

The conduit LB1 is a conduit used for decreasing the brake hydraulic pressure. Furthermore, the conduit LB1 connects a regulating reservoir RR1 on the one hand and a portion of the first conduit LAfl extending between the first pressure increase control valve SZfl and the wheel cylinder WCfl and a portion of the second conduit LAfr extending between the second pressure increase control valve SZfr and the wheel cylinder WCfr on the other. A first pressure decrease control valve SGfl (which is also referred to as an outlet valve) and a second pressure decrease control valve SGfr are provided at the conduit LB1. Each of the first pressure decrease control valve SGfl and the second pressure decrease control valve SGfr is configured as a two position electromagnetic valve that is controlled to be in a communication establishing state (i.e. a state where the brake fluid is allowed to flow through the two position electromagnetic valve, an open position) and a communication interrupting state (i.e. a state where the flow of the brake fluid is interrupted, a closed position). Each of the first and second pressure decrease control valves SGfl and SGfr is configured as a co-called normally-closed type valve, which is turned to be in the communication interrupting state (the closed position) when the electricity is not supplied thereto, and which is turned to be in the communication state (the open position) in a case where the electricity is supplied to each of the first and second pressure decrease control valves SGfl and SGfr. The hydraulic pressure at each of the wheel cylinders WCfl and WCfr is decreased down to a pressure level corresponding to the hydraulic pressure at the conduit LA1 in the case where each of the first and second pressure decrease control valves SGfl and SGfr is turned to be in the communication state (the open position).

The conduit LC1 is provided between the regulating reservoir RR1 and the conduit LA1. A hydraulic pump OP1 is provided at the conduit LC1. A brake fluid is sucked by the hydraulic pump OP1 via the regulating reservoir RR1. Then, the hydraulic pump OP1 discharges the brake fluid to the master cylinder MC or to the wheel cylinders WCfl and WCfr. Furthermore, the hydraulic pump OP1 is driven by an electric motor MT. The conduit LD1 is provided between the regulating reservoir RR1 and the master cylinder MC. In a case where an automatic pressure generation (i.e. an automatic supply of the brake hydraulic pressure) is executed while, for example, the vehicle stabilizing control, the traction control and the like is being executed, the brake fluid is sucked by the hydraulic pump OP1 from the master cylinder MC through the conduit LD1, and then, the hydraulic pump OP1 discharges the brake fluid to the conduits LC1, LAfl and LAfr. Accordingly, the brake fluid is supplied to the wheel cylinders WCfl and WCfr, so that the brake hydraulic pressure generated at wheel cylinder WC** of the target wheel is increased so as to exceed a level of the hydraulic pressure at the conduit LA1. Furthermore, an increase (an increasing level) of the brake hydraulic pressure (i.e. the hydraulic pressure of the conduit LC1 relative to the hydraulic pressure of the conduit LA1, the pressure difference between the hydraulic pressure at the conduit LA1 and the hydraulic pressure at the conduit LC1) is adjusted by controlling the electrification (the electric current value or the voltage duty) to the first differential pressure control valve SS1.

The second brake circuit HP2 (the second hydraulic brake circuit system) has a similar configuration to the first brake circuit HP1. More specifically, the second brake circuit HP2 is explainable by substituting "the front wheel" in the explanation of the first brake circuit HP1 with the "rear wheel", substituting a number "1" with a number "2" (e.g. substituting the conduit "LA1" with a conduit "LA2"), substituting the reference alphabets "fl" with reference alphabets "rl" and substituting the reference alphabets "fr" with reference alphabets "rr".

The brake actuator BR illustrated in FIG. 3 has a front-rear split dual circuit system. However, the brake actuator BR may be modified so as to have a diagonal split dual circuit system (an X-type brake circuit system). In a case where the brake actuator BR has the diagonal split dual circuit system, components (e.g. the conduits, the electromagnetic valves, the wheel cylinders and the like) relating to the front-left wheel and the rear-right wheel are provided at the first brake circuit HP1 (the first hydraulic brake circuit system) and components relating to the front-right wheel and the rear-left wheel are provided at the second brake circuit HP2 (the second hydraulic brake circuit system). In other words, in the case where the brake actuator BR has the diagonal split dual circuit system, the components (the conduits, the electromagnetic valves, the wheel cylinders and the like) relating to the front-right wheel, which are indicated with the reference alphabets "fr", in the first brake circuit HP1 (the first hydraulic brake circuit system) are replaced by the components relating to the rear-right wheel, which are indicated with the reference alphabets "rr", and the components relating to the rear-right wheel, which are indicated by the reference alphabets "rr", in the second brake circuit HP2 (the second hydraulic brake circuit system) are replaced by the components relating to the front-right wheel, which are indicated by the reference alphabets "fr", in the configuration illustrated in FIG. 3 (see reference alphabets in square brackets).

Figure 4:
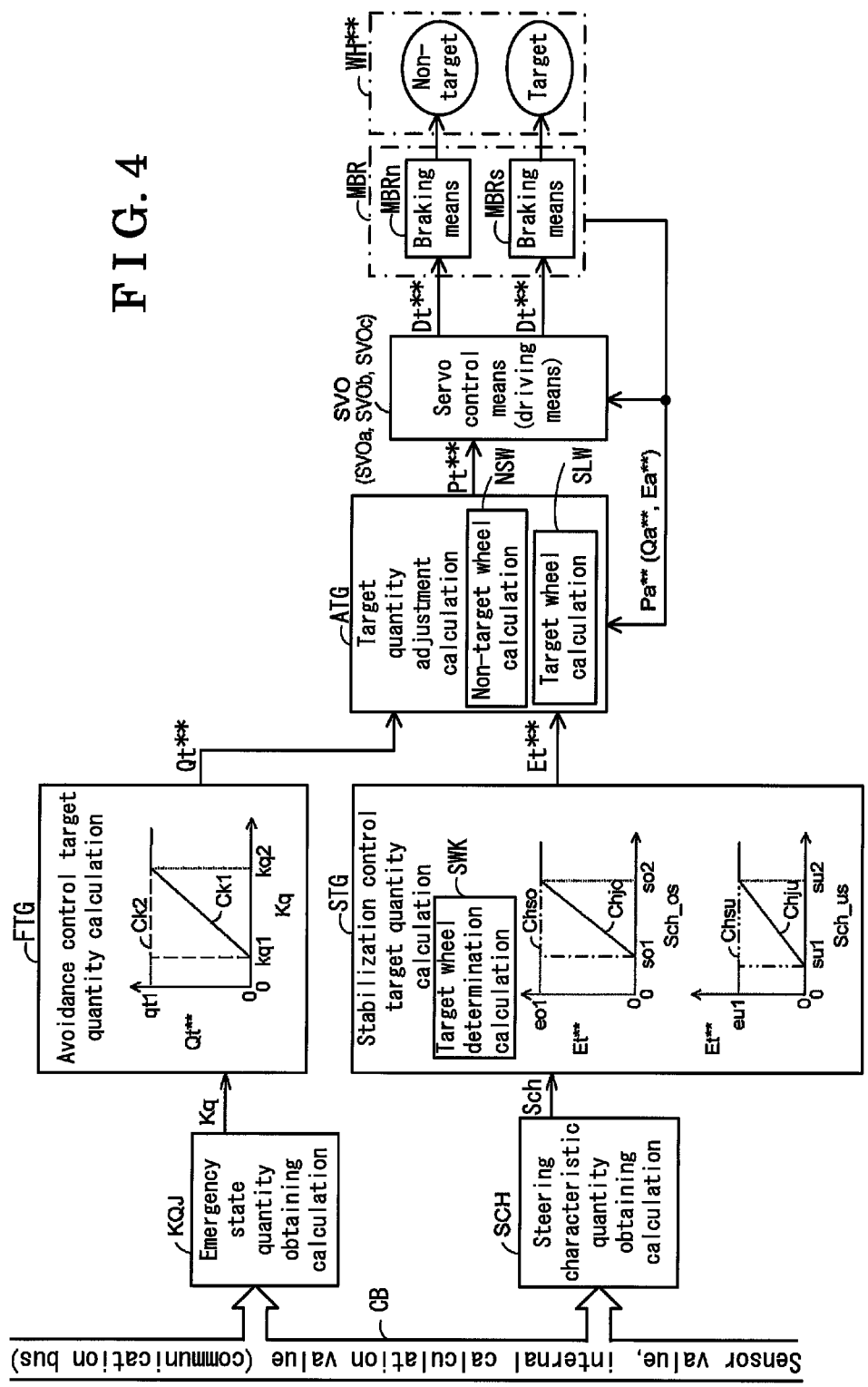
FIG. 4 is a functional block diagram illustrating a processing example executed by the motion control device for the vehicle according to the first embodiment.

Illustrated in FIG. 4 is a functional block diagram of a processing example executed by the motion control device for the vehicle according to the first embodiment. Functional blocks indicated by the same reference numbers or the same reference alphabets as in the means in FIG. 1 have similar functions as the corresponding means.

An emergency state quantity Kq is obtained at an emergency state quantity obtaining calculation block KQJ on the basis of a sensor signal(s) and/or an internal calculation value of other electronic control unit(s), which are obtained via the communication bus BC. The emergency state quantity Kq represents a state quantity (a property) indicating the emergency state of the vehicle. For example, in a case where the emergency state of the vehicle indicates a possibility of the collision of the vehicle against the obstacle, a deviation between a collision avoidance vehicle speed Vxs (a target vehicle speed for avoiding the collision of the vehicle against the obstacle), which is calculated on the basis of the distance between the subject vehicle and the obstacle and a relative speed of the subject vehicle relative to the obstacle, and the speed Vxa of the subject vehicle as the emergency state quantity Kq. The distance between the subject vehicle and the obstacle and the relative speed of the subject vehicle relative to the obstacle are calculated by using known methods on the basis of the laser sensor or the image captured by the camera. Furthermore, in a case where the emergency state of the vehicle indicates a possibility of the departure of the vehicle from the curve existing ahead of the vehicle, a deviation between an appropriate vehicle speed Vxt (a target vehicle speed for stably passing through the curve without departing therefrom), which is calculated on the basis of the curvature radius of the curve, and the actual vehicle speed Vxa is calculated as the emergency state quantity Kq. The curvature radius is calculated by using a known method on the basis of the information obtained from the navigation device or the image captured by the camera. The greater a value of the emergency state quantity Kq is, the higher the emergency state the vehicle is in. The emergency state quantity Kq may be calculated as a deceleration (a target value) necessary for avoiding the collision of the vehicle against the obstacle. Furthermore, the emergency state quantity Kq may be calculated as a deceleration (a target value) necessary for the vehicle to stably pass through the curve.

The target quantity Qt (the first target quantity) is calculated at an avoidance control target quantity calculation block FTG, which corresponds to a first target quantity calculation, by using a preliminarily set calculation map on the basis of the emergency sate quantity Kq. The calculation map is set so as to have a characteristic in which, as indicated by a characteristic Ck1, the target quantity Qt is maintained at zero (0) by which the avoidance control is not executed in a case where the emergency state quantity Kq is smaller than a predetermined value kq1, and then, the target quantity Qt increases from zero (0) as the emergency state quantity Kq increases in a range of the emergency state quantity Kq being equal to or greater than the predetermined value kq 1 and smaller than a predetermined value kq2, and the target quantity Qt is maintained at a predetermined value qt1 (an upper limit value) in a case where the emergency state quantity Kq is equal to or greater than the predetermined value kq2. Furthermore, the calculation map may be set so as to have a characteristic in which, as indicated by a characteristic Ck2 (indicated by a broken line), the target quantity Qt is maintained at zero (0) in the case where the emergency state quantity Kq is smaller than the predetermined value kq1 and the target quantity Qt is maintained at the predetermined value qt1 (the upper limit value) in a range where the emergency state quantity Kq being equal to or greater than the predetermined value kq1. The target quantity Qt** is increased from zero (0) when the emergency state quantity Kq reaches the predetermined value kq1. Therefore, the predetermined value kq1 serves as a start condition for executing the avoidance control.

A steering characteristic quantity Sch is obtained at a steering characteristic quantity obtaining calculation block SCH on the basis of the sensor signal(s) and/or the internal calculation value of other electronic control unit(s), which are obtained via the communication bus CB. The steering characteristic quantity Sch is a state quantity (a property) indicating a degree of the oversteering tendency of the vehicle and/or a degree of the understeering tendency of the vehicle. The steering characteristic quantity Sch is calculated on the basis of a target turning quantity Jrt and an actual turning quantity Jra. More specifically, the steering characteristic quantity Sch (the state quantity indicating the degree of the oversteering and the degree of the understeering of the vehicle) is calculated by comparing the actual turning quantity Jra with the target turning quantity Jrt. For example, firstly, a target yaw rate Yrt is calculated on the basis of the vehicle speed Vxa and the steering wheel angle θsw (or a front wheel steering angle δfa). Then, a deviation ΔYr between the target yaw rate Yrt and the actual yaw rate Yra (i.e. ΔYr=Yra−Yrt, a yaw rate deviation) is calculated as the steering characteristic quantity Sch. The steering characteristic quantity Sch may be calculated as an interrelation between plural state quantities, instead of a single state quantity. For example, the steering characteristic quantity Sch may be calculated on the basis of an interrelation between a deviation Δβ between an actual side slip angle βa and a target side slip angle βt (i.e. Δβ=βa−βt, a side slip angle deviation) and the yaw rate deviation ΔYr (i.e. steering characteristic quantity Sch=K1*Δβ+K2*ΔYr, where K1 and K2 are coefficients). In a case where the side slip angle or a side slip angular velocity is used as the turning quantity, a target value of the side slip angle or the side slip angular velocity may be set as a constant (e.g. the target value of the side slip angle or the side slip angular velocity may be set as zero (0)). Therefore, in this case, the target turning quantity Jrt may be omitted from the calculation of the steering characteristic quantity Sch, and the steering characteristic quantity Sch may be calculated on the basis only of the actual turning quantity Jra.

More specifically, in the calculation of the steering characteristic quantity Sch, a steering characteristic quantity Sch_os indicating the degree of the oversteering tendency and a steering characteristic quantity Sch_us indicating the degree of the understeering tendency may be respectively calculated on the basis of individual and separate calculation methods. For example, the steering characteristic quantity Sch_us may be calculated on the basis of the yaw rate deviation ΔYr and the steering characteristic quantity Sch_os may be calculated on the basis of the interrelation between the side slip angle and the side slip angular velocity.

The target quantity Et (the second target quantity) is calculated at a stabilization control target quantity calculation block STG, which corresponds to a second target quantity calculation, on the basis of the steering characteristic quantity Sch. Firstly, the target wheel to which the brake torque is to be applied in order to execute the stabilization control is determined (selected) at a target wheel determination calculation block SWK on the basis of the steering characteristic quantity Sch. The wheel, which is selected by the target wheel determination calculation block SWK and to which the brake torque is applied in order to execute the stabilization control, is referred to as the target wheel (a selected wheel). Other wheels, which differ from the target wheel that is selected from four wheels (the front-right, the front-left, the rear-right and rear-left wheels) of the vehicle, and which are not selected as the target wheel, to which the brake torque is applied, by the target wheel determination calculation block SWK, are referred to as non-target wheels (non-selected wheels). In the case where the steering characteristic quantity Sch indicates the oversteering tendency, a turning outer front wheel is determined as the target wheel. On the other hand, in the case where the steering characteristic quantity Sch indicates the understeering tendency, a turning inner rear wheel is determined as the target wheel. Then, the target quantity Et relative to the determined target wheel is determined on the basis of the steering characteristic quantity Sch (Sch_os, Sch_us).

In the case where the vehicle is in the oversteering tendency, the target quantity Et is calculated by using a preliminarily set calculation map on the basis of the steering characteristic quantity Sch_os. The calculation map is set to have a characteristic in which, as indicated by a characteristic Chjo, the target quantity Et is maintained at zero (0), by which the stabilization control is not executed, in a case where the steering characteristic quantity Sch_os is smaller than a predetermined value so1, then, the target quantity Et is increased from zero (0) as the steering characteristic quantity Sch_os increases in a range between the steering characteristic Sch_os being equal to or grater than the predetermined value so1 and smaller than a predetermined value so2 and the target quantity Et is maintained at a predetermined value eo1 (an upper limit value) in a case where the steering characteristic quantity Sch_os is equal to or greater than the predetermined value so2. Furthermore, the calculation map may be set so as to have a characteristic in which, as illustrated by a characteristic Chso (indicated by an alternate long and short dash line), the target quantity Et is maintained at zero (0) in a case where the steering characteristic quantity Sch_os is smaller than the predetermined value so1 and the target quantity Et is maintained at the predetermined value qt1 (the upper limit value) in a range where the steering characteristic quantity Sch_os is equal to or greater than the predetermined value so1. The target quantity Et** is increased from zero (0) when the steering characteristic quantity Sch_os reaches the predetermined value so1. Therefore, the predetermined value so1 serves as a start condition for executing the stabilization control (an oversteering restriction control).

In the case where the vehicle is in the understeering tendency, the target quantity Et is calculated by using a preliminarily set calculation map on the basis of the steering characteristic quantity Sch_us. The calculation map is set so as to have a characteristic in which, as indicated by a characteristic Chju, the target quantity Et is maintained at zero (0), by which the stabilization control is not executed, in a case where the steering characteristic quantity Sch_us is smaller than a predetermined value su1, then the target quantity Et is increased from zero (0) as the steering characteristic quantity Sch_us increases in a range between the steering characteristic quantity Sch_us being equal to or greater than the predetermined value su1 and smaller than a predetermined value su2, and the target quantity Et is maintained at a predetermined value eu1 (an upper limit value) in a case where the steering characteristic quantity Sch_us is greater than the predetermined value su2. Furthermore, the calculation map may be set so as to have a characteristic in which, as indicated by a characteristic Chsu (indicated by a chain double-dashed line), the target quantity Et** is maintained at zero (0) in the case where the steering characteristic quantity Sch_us is smaller than the predetermined value su1 and the target quantity Et* is maintained at the predetermined value qt1 (the upper limit value) in a range where the steering characteristic quantity Sch_us being equal to or greater than the predetermined value su1. The target quantity Et** is increased from zero (0) when the steering characteristic quantity Sch_us reaches the predetermined value su1. Therefore, the predetermined value su1 serves as a start condition for executing the stabilization control (the understeering restriction control).

The target quantity Qt and the target quantity Et are adjusted at a target quantity adjustment calculation block ATG in order to obtain the adjusted and final target quantity Pt. Additionally, because the case where only the avoidance control is executed (i.e. only the avoidance control means MKQ is activated), the case where only the stabilization control is executed (i.e. only the stabilization control means MES is activated) and the case where the avoidance control and the stabilization control are simultaneously executed (i.e. the avoidance control means MKQ, the stabilization control means MES and the brake control means MBC are activated) are separately explained with reference to FIG. 1, the target adjustment calculation block ATG is configured so as to be activated only in the case where the avoidance control and the stabilization control are simultaneously executed. However, because non-execution of the avoidance control may be indicated by the target quantity Qt being zero (0: Qt=0) and non-execution of the stabilization control may be indicated by the target quantity Et being zero (0: Et**=0), the target quantity adjustment calculation block ATG may be activated in a case where at least one of the avoidance control and the stabilization control is executed.

The target quantity adjustment calculation block ATG includes a non-target wheel calculation block NSW and a target wheel calculation block SLW. The target quantity pr* to be applied to the target wheel, which is determined by the target wheel determination calculation block SWK as a target of the stabilization control, is calculated at the target wheel calculation block SLW on the basis of the target quantity Qt (the first target quantity) of the target wheel and the target quantity Et (the second target quantity) of the target wheel. On the other hand, the target quantity Pt to be applied to the non-target wheel (i.e. the non-target wheel that differs from the target wheel), which is determined by the target wheel determination calculation block SWK, is calculated at the non-target wheel calculation block NSW on the basis of the target quantity Qt (the first target quantity) of the non-target wheel.

In the case where the stabilization control is not executed (i.e. Qt=0), the target wheel does not exist (is not determined) and all wheels are determined as the non-target wheels. Therefore, in this case, the target quantity Qt is outputted from the non-target wheel calculation block NSW as the target quantity Pt (i.e. Pt=Qt**).

On the other hand, in the case where the avoidance control is not executed (i.e. Qt**=0), the target quantity Pt* (=Qt) =zero (0) is outputted to the non-target wheel from the non-target wheel calculation block NSW. Furthermore, the target quantity Pt (=Et+Qt), which corresponds to the target quantity Et (Pt=Et**) in this case, is outputted to the target wheel from the target wheel calculation block SLW.

In the case where the avoidance control and the stabilization control are simultaneously executed (e.g. in the case where the stabilization control is started while the avoidance control is being executed), the target quantity Pt of the non-target wheel is calculated at the non-target wheel calculation block NSW on the basis of the target quantity Qt relative to the non-target wheel (i.e. Pt=Qt). Furthermore, the target quantity Pt of the target wheel is calculated at the target wheel calculation block SLW on the basis of the target quantity Et (the second target quantity) of the target wheel and the target quantity Qt (the first target quantity) of the target wheel. More specifically, the target quantity Pt of the target wheel is calculated as a value obtained by adding the target quantity Qt of the target wheel to the target quantity Et of the target wheel (i.e. Pt=Et+Qt**).

The signal Dt for driving the braking means MBR is calculated at the servo control means SVO (which corresponds to the servo control means SVOa, the servo control means SVOb and the servo control means SVOc in FIG. 1) on the basis of the adjusted target quantity Pt. The braking means MBR is controlled on the basis of the drive signal Dt*, so that the brake torque is applied to the wheel WH. For example, the electric motor, the hydraulic pump(s) and the electromagnetic valve(s) are controlled on the basis of the drive signal Dt, so that the brake hydraulic pressure of the wheel cylinder WC is increased. A sensor for detecting the actual quantity Pa (the actual quantity Qa of the avoidance control in the case where the stabilization control is not executed, the actual quantity Ea of the stabilization control in the case where the avoidance control is not executed), which corresponds to the brake torque to be actually applied to the wheel WH, is provided at the braking means MBR. More specifically, at least one of a hydraulic pressure sensor for detecting the brake hydraulic pressure, a torque sensor for detecting the shaft torque (the brake torque) of the wheel WH and the force sensor for detecting the pressing force of the brake pad PD is provided at the braking means MBR, so that the actual quantity Pa is calculated on the basis of an output from at least one of the hydraulic pressure sensor, the torque sensor and the force sensor. The actual quantity Pa may be calculated on the basis of the wheel speed Vw, which is detected by the wheel speed sensor WS, because the wheel slip occurs at the wheel WH because of the brake torque applied thereto and the wheel braking force is generated thereat due to the wheel slip. Furthermore, the actual quantity Pa may be calculated on the basis of the actuation states (the electrification states) of the corresponding hydraulic pump and the corresponding electromagnetic valve(s). The drive signal Dt is calculated at the emergency state quantity obtaining calculation block KQJ on the basis of the target quantity Pt and the actual quantity Pa.

In this embodiment, the adjusted and final target quantity Pt is calculated at the target wheel calculation block SLW on the basis of the first target quantity Qt and the second target quantity Et. Alternatively, the final target quantity Pt may be calculated on the basis of the second target quantity Et of the target wheel and the first actual quantity Qa of the non-target wheel (i.e. the first actual quantity Qa corresponds to the actual quantity Pa (Pa=Qa) because the target quantity Et** is not applied to the non-target wheel).

A difference may occur between the target quantity Qt and the actual quantity Qa. However, because the stabilization control is executed on the basis of the actual quantity Qa (the first actual quantity) of the non-target wheel, which is influenced only by the avoidance control, an influence of the difference between the target quantity Qt and the actual quantity Qa** may be compensated.

Figure 5:
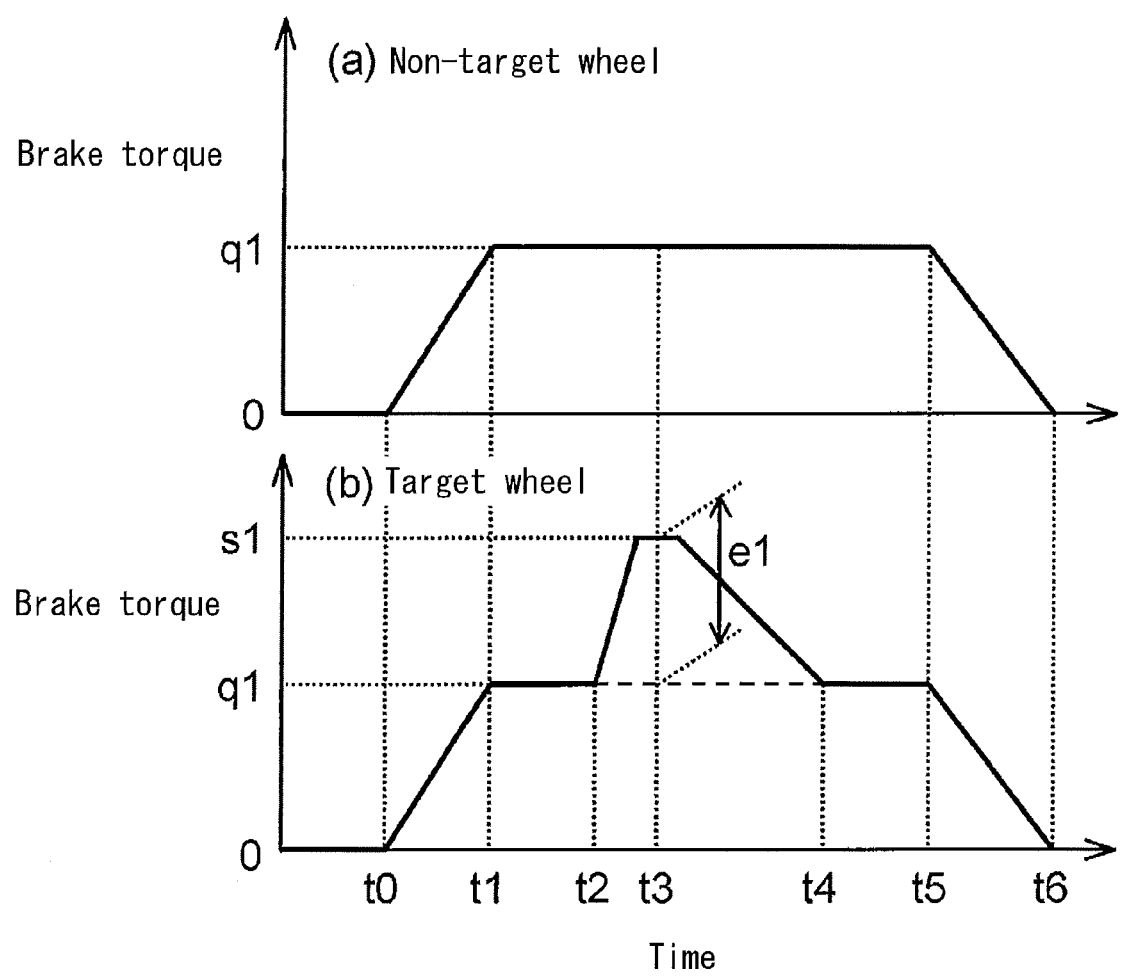
FIG. 5 is a time series graph for explaining advantages and merits of the motion control device for the vehicle according to the first embodiment.

Advantages and merits of the device according to the first embodiment will be described below with reference to FIG. 5. In the case where the avoidance control is executed solely, the control is executed on the basis of the first target quantity Qt and the first actual quantity Qa. On the other hand, in the case the stabilization control is executed solely, the control is executed on the basis of the second target quantity Et and the second actual quantity Ea.

Additionally, the symbols "**" comprehensively indicate the wheels. For example, "fl" indicates the front-left wheel, "fr" indicates the front-right wheel, "rl" indicates the rear-left wheel and "rr" indicates the rear-right wheel.

In the first embodiment, the avoidance control is firstly executed at time t0 by means of the avoidance control means MKQ on the basis of the emergency state quantity Kq. Then, the braking means MBR, which is provided at each of the front-right wheel, the front-left wheel, the rear-right wheel and the rear-left wheel, is driven and controlled on the basis of the first target quantity Qt, so that the brake torque (a value q1), which corresponds to the first actual quantity Qa (Pa**), is generated at the corresponding wheel.

Then, the stabilization control (i.e. the determination of the target wheel and supply of the brake torque to the determined target wheel) is started by the stabilization control means MES on the basis of the steering characteristic quantity Sch at time t2. In the case where the steering characteristic quantity Sch indicates the understeering tendency, the turning inner rear wheel is determined (selected) as the target wheel (i.e. the wheel to which the brake torque is applied by the stabilization control). For example, in a case where the vehicle turns in a right direction and the steering characteristic quantity Sch indicates the understeering tendency, the rear-right wheel WHrr is determined as the target wheel. On the other hand, in a case where the vehicle turns in the right direction and the steering characteristic quantity Sch indicates the oversteering tendency, the front-left wheel WHfl is determined (selected) as the target wheel.

In the case where the avoidance control and the stabilization control are simultaneously executed by the brake control means MBC (e.g. in the case where the stabilization control is started while the avoidance control is being executed), the braking means MBRn of the non-target wheel (i.e. the wheel that is not selected as the target wheel) is controlled on the basis of the first control quantity Qt of the non-target wheel. Furthermore, the braking means MBRs of the target wheel is controlled by the brake control means MBC on the basis of the first control quantity Qt of the target wheel and the second target quantity Et of the target wheel. More specifically, the target quantity Pt of the target wheel is obtained by adding the first target quantity Qt of the target wheel and the second target quantity Et of the target wheel. In a case where the stabilization control is started while the brake torque is increased to the value q1 by the avoidance control (the sole execution of the avoidance control), the brake torque of the target wheel becomes a value s1 because the brake torque of the target wheel is increased by the brake torque (a value e1) generated by the stabilization control from the value q1 (see time t3).

In the first embodiment, because the brake torque of the target wheel is controlled also in view of the target quantity Qt (the first target quantity) of the avoidance control in addition to the target quantity Et (the second target quantity) of the stabilization control, the stability of the vehicle may be ensured while ensuring the vehicle deceleration required by the avoidance control. As a result, the interference between the (emergency) avoidance control for avoiding the emergency state and the stabilization control for stabilizing a yawing motion of the vehicle may be avoided.

The braking means MBRn of the non-target wheel is controlled by the brake control means MBC on the basis of the first target quantity Qt and the first actual quantity Qa of the non-target wheel. Additionally, the braking means MBRs of the target wheel is controlled on the basis of the first actual quantity Qa of the non-target wheel and the second target quantity Et of the target wheel. More specifically, the target quantity Pt of the target wheel is obtained by adding the first actual quantity Qa of the non-target wheel to the second target quantity Et** of the target wheel.

The difference may occur between the target quantity and the actual quantity. However, because the stabilization control is executed in view of the first actual quantity of the non-target wheel, to which the brake torque is applied by the sole execution of the avoidance control, the influence of the difference between the target quantity and the actual quantity may be compensated.

Second Embodiment

Figure 6:
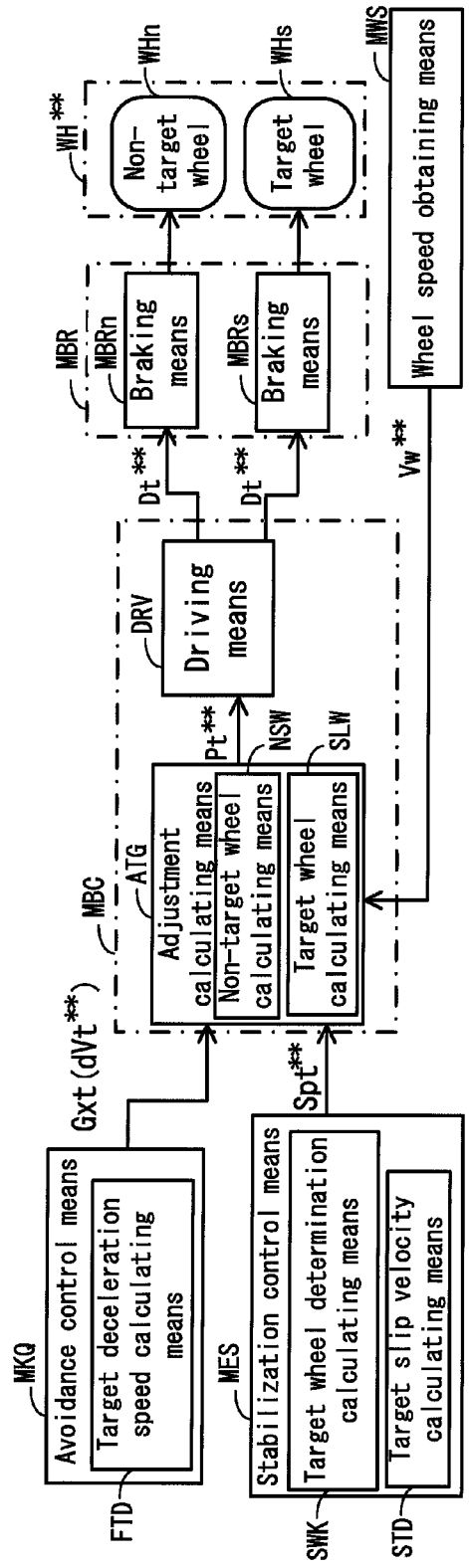
FIG. 6 is a diagram illustrating an entire configuration of a motion control device for a vehicle according to a second embodiment.

A second embodiment of a motion control device for a vehicle (which will be hereinafter referred to simply as a device) will be described below with reference to the attached drawings. In the second embodiment, means and functional blocks having the same or similar function and configuration as the corresponding means and functional blocks of the device according to the first embodiment are indicated by the identical reference numerals. Illustrated in FIG. 6 is an entire configuration of the device according to the second embodiment. As illustrated in FIG. 6, the device includes a braking means MBR, an avoidance control means MKQ, a stabilization control means MES, a wheel speed obtaining means MWS and a brake control means MBC.

Symbols "" are used to comprehensively indicate wheels. For example, "fl" indicates a front-left wheel, "fr" indicates a front-right wheel, "rl" indicates a rear-left wheel and "rr" indicates a rear-right wheel. Reference alphabets in brackets "{s}" and "{n}" inserted between reference alphabets and the symbol "" indicate whether or not the subject wheel is a "target wheel" determined by the stabilization control means MES. More specifically, the reference alphabet in brackets "{s}" indicates a relation to the target wheel. On the other hand, the reference alphabet in brackets "{n}" indicates a relation to a non-target wheel, i.e. a wheel which is not determined as the target wheel by the stabilization control means MES (the wheel(s) except for the target wheel(s)).

The braking means MBR of the device according to the second embodiment has the same configuration as the braking means MBR of the device according to the first embodiment. Accordingly, the detailed explanation of the braking means MBR is omitted here.

The avoidance control means MKQ includes a target deceleration calculating means FTD. A target deceleration Gxt (a target quantity for the avoidance control), which is set as a target for an avoidance control, is calculated at the target deceleration calculating means FTD. More specifically, the target deceleration Gxt is calculated as a deceleration of the vehicle necessary to avoid an emergency state of the vehicle.

The stabilization control means MES includes a target wheel determination calculating means SWK and a target slip velocity calculating means STD. A wheel to which a brake torque is to be applied in order to maintain a vehicle stability (i.e. a target wheel WHs) is selected and determined from four wheels WH**, which are provided at front-right, front-left, rear-right and rear-left portions of the vehicle, respectively, by the target wheel determination calculating means SWK. The wheel(s) other than the target wheel WHs, which is determined by the target wheel determination calculating means SWK, is (are) set as a non-target wheel(s) WHn. The non-target wheel WHn is the wheel, which differs from the target wheel WHs (i.e. the wheel that is not determined as the target wheel WHs). In the case where a stabilization control is not executed, all four wheels are determined as the non-target wheels WHn.

A target slip velocity Spt (a positive value) (a target quantity for the stabilization control), which is set as a target of a longitudinal slip occurring at each wheel (i.e. a difference between a vehicle body speed and the wheel speed), is calculated at the target slip velocity calculating means STD. More specifically, the target slip velocity calculating means STD calculates the target slip velocity Spt{n} as zero (0) (i.e. Spt{n}=0) for the non-target wheel WHn, so that the brake torque for stabilizing the vehicle is not applied to the non-target wheel WHn. On the other hand, the target slip velocity Spt{s} for the target wheel WHs (i.e. the wheel selected as the target) is calculated so as to be greater than zero (0) (i.e. Spt{s}**>0).

An actual speed Vw of each wheel (i.e. an actual wheel speed Vw) is obtained at the wheel speed obtaining means MWS. More specifically, the actual wheel speed Vw may be calculated on the basis of the detection result of a wheel speed sensor SW.

The brake control means MBC includes a (target quantity) adjustment calculating means ATG and a driving means DRV. The adjustment calculating means ATG includes a non-target wheel calculating means NSW and a target wheel calculating means SLW. A final target quantity Pt is calculated by the adjustment calculating means ATG in view of the target deceleration Gxt, the target slip velocity Spt and the actual wheel speed Vw*.

A target quantity Pt{n} for the braking means MBRn of the non-target wheel (i.e. the wheel differing from the wheel determined by the target wheel determination calculating means SWK as the target of the supply of the brake torque) is calculated at the non-target wheel calculating means NSW on the basis of the target deceleration Gxt of the non-target wheel. On the other hand, a target quantity Pt{s} for the braking means MBRs of the target wheel WHs (i.e. the wheel determined by the target wheel determination calculating means SWK as the target of the supply of the brake torque) is calculated by the target wheel calculating means SLW on the basis of the target quantity Spt{s} of the target wheel WHs and an actual speed Vw{n} of the non-target wheel WHn. More specifically, the adjusted target quantity Pt of the target wheel is calculated in a manner where the target slip velocity Spt{s} of the target wheel is subtracted from the actual wheel speed Vw{n}** of the non-target wheel.

Accordingly, the target quantity Pt{s} of the target wheel and the target quantity Pt{n} of the non-target wheel are obtained as values that have different physical quantities from each other. The physical quantity is a property, whose measurement target has a dimension such as mass, force, length, time and the like and which is objectively measured (including a quantity that is calculated by using the objectively measured quantity). The physical quantity of the target quantity Pt{s} is speed (i.e. the dimension of the speed is obtained by dividing the length by the time (Length/Time)). On the other hand, the physical quantity of the target quantity Pt{n} is acceleration speed (i.e. the dimension of the acceleration speed is obtained by the following formula: Length/(Time*Time)).

A drive signal Dt for controlling the braking means MBR (the braking means MBRn and the braking means MBRs) is generated at the driving means DRV on the basis of the target quantity Pt. The braking means MBR is controlled on the basis of the drive signal Dt and applies the brake torque to the wheel WH.

The avoidance control is a control for avoiding the emergency state of the vehicle by decelerating the vehicle. The deceleration of the vehicle is achieved by generating the braking force at the wheel WH. On the other hand, the stabilization control is a control for ensuring the stability of the vehicle by applying a stabilization yawing moment to the vehicle. The yawing moment is generated by controlling the braking force of the wheel WH. Each of the avoidance control and the stabilization control executes the control of the braking force of the wheel WH, but performs different and separate functions from each other. In a case where the avoidance control and the stabilization control are simultaneously executed while exercising different and separate functions instead of simply switching the control between the avoidance control and the stabilization control, the target quantity of the braking force needs to be separately and independently adjusted for each wheel WH. In other words, in this case, either one of the avoidance control and the stabilization control is executed to a certain wheel(s) and the brake force of the other wheel(s) is controlled by the other one of the avoidance control and the stabilization control. Accordingly, the target quantity needs to be determined for the braking force, which is the physical quantity commonly used for the avoidance control and the stabilization control, and the actual braking force needs to be detected in order to execute the control. However, a brake torque sensor, a brake hydraulic pressure sensor or the like needs to be provided at each wheel WH in order to separately and independently detect the braking force generated at each wheel WH.

The braking force of the wheel WH is generated due to the longitudinal slip of the wheel WH (the difference between the vehicle body speed and the wheel speed). The brake torque is applied to the non-target wheel only by the avoidance control. Therefore, an influence of the control quantity only by the avoidance control (i.e. the brake torque only by the avoidance control) is reflected in the actual wheel speed of the non-target wheel. The brake torque of the target wheel is controlled on the basis of the actual wheel speed of the non-target wheel and the target quantity of the stabilization control for the target wheel (i.e. the target slip velocity). Therefore, the stability of the vehicle may be maintained while the vehicle deceleration by the avoidance control is ensured with a simple configuration of the device.

The vehicle having the device according to the second embodiment has a similar configuration as the vehicle having the device according to the first embodiment (see FIG. 2). Therefore, the difference between the first embodiment and the second embodiment will be mainly described below.

The configuration of the vehicle according to the second embodiment is similar to the configuration of the vehicle according to the first embodiment except that the vehicle according to the second embodiment does not include the brake hydraulic pressure sensor PS for detecting the brake pressure Psa generated within the wheel cylinder WC**.

An electronic control unit ECU of the vehicle having the device according to the second embodiment has a similar configuration to the electronic control unit ECU of the vehicle having the device according to the first embodiment, except that a wheel brake control unit ECUb of the electronic control unit ECU according to the second embodiment is also configured so as to calculate an actual vehicle speed Vxa (the vehicle body speed) on the basis of the wheel speed Vw, which is the detection result of the wheel speed sensor WS, and a known method. Furthermore, the wheel brake control unit ECUb is configured so as to calculate the deceleration Gxa of the vehicle on the basis of the vehicle speed Vxa.

Figure 7:
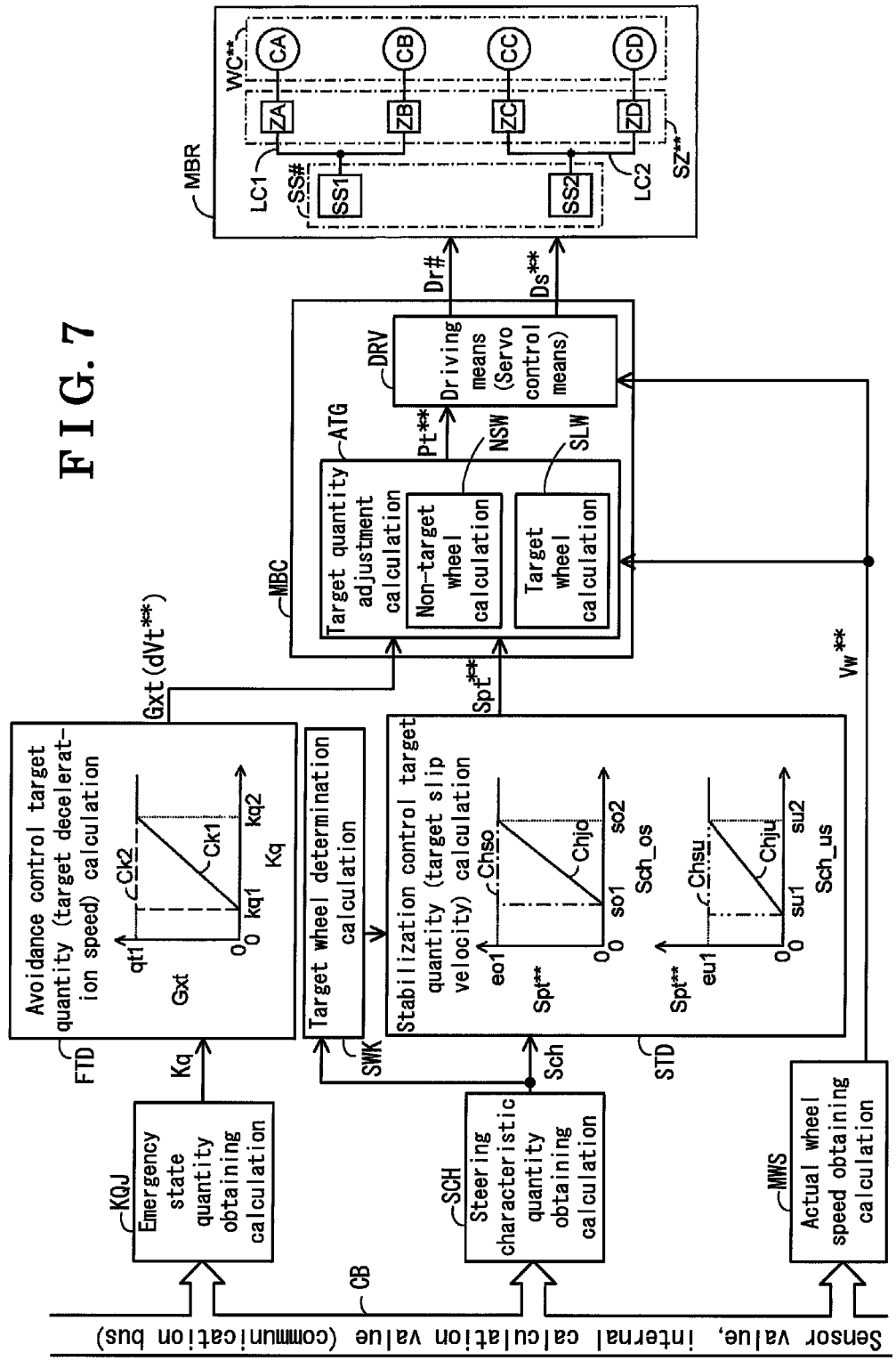
FIG. 7 is a functional block diagram illustrating a processing example executed by the motion control device for the vehicle according to the second embodiment.

A processing example executed by the device according to the second embodiment will be described below with reference to FIG. 7. Functional blocks indicated by the identical reference alphabets as the means in FIG. 6 indicate that the functional blocks have the similar functions as the corresponding means.

An emergency state quantity Kq is obtained at an emergency state quantity obtaining calculation block KQJ via a sensor signal(s) and/or an inner calculation value of other electronic control unit(s), which are obtained via a communication bus CB. The emergency state quantity Kq is a property indicating the emergency state of the vehicle. For example, in a case where the vehicle emergency state indicates a possibility of a collision of the vehicle against an obstacle, a deviation between the speed Vxa of the subject vehicle and a collision avoidance speed Vxs (i.e. a target vehicle speed for avoiding the collision of the vehicle against the obstacle), which is calculated on the basis of a distance between the subject vehicle and the obstacle and a relative speed of the subject vehicle relative to the obstacle, is calculated as the emergency state quantity Kq. The distance between the subject vehicle and the obstacle and the relative speed of the subject vehicle relative to the obstacle are calculated by using known methods on the basis of an output from a laser sensor or an image captured by a camera. In a case where the emergency state indicates a possibility of a departure of the vehicle from a curve existing ahead of the vehicle, a deviation between an appropriate vehicle speed Vxt (a target vehicle speed for the vehicle stably passing through the curve without departing therefrom), which is calculated on the basis of a curvature radius, and the actual vehicle speed Vxa (the vehicle body speed) is calculated as the emergency state quantity Kq. The curvature radius of the curve is calculated by using a known method on the basis of a navigation device NV or the image captured by the camera. The greater a value of the emergency state quantity Kq is, the higher emergency state the vehicle is in. The emergency state quantity Kq may be calculated as a deceleration (a target deceleration) necessary for avoiding the collision of the vehicle against the obstacle. Furthermore, the emergency state quantity Kq may be calculated as a deceleration (a target deceleration) necessary for the vehicle to stably pass through the curve.

The target deceleration Gxt (the target quantity) is calculated at an avoidance control target quantity calculation block FTD (which corresponds to the target deceleration calculating means FTD) by using a preliminarily set calculation map on the basis of the emergency state quantity Kq. As indicated by a characteristic Ck1, the calculation map is set so as to have a characteristic in which the target quantity Gxt is maintained at zero (0: non-execution of the avoidance control) in a case where the emergency state quantity Kq is smaller than a predetermined value kq1, the target quantity Gxt increases from zero (0) as the emergency state quantity Kq increases in a case where the emergency state quantity Kq falls within a range between equal to or greater than the predetermined value q1 and smaller than a predetermined value kq2, and the target quantity Gxt is maintained at a predetermined value qt1 (an upper limit value) in a case where the emergency state quantity Kq is equal to or greater than the predetermined value kq2. Furthermore, the calculation map may be set so as to have a characteristic in which, as indicated by a characteristic Ck2 (indicated by a broken line), the target quantity Gxt is maintained at zero (0) in the case where the emergency state quantity Kq is smaller than the predetermined value kq1 and the target quantity Gxt is maintained at the predetermined value qt1 (the upper limit value) in a case where the emergency state quantity Kq is equal to or greater than the predetermined value kq1. The target quantity Gxt is increased from zero (0), which indicates the non-execution of the control, when the emergency state quantity Kq reaches the predetermined value kq1. Therefore, the predetermined value kq1 serves as a starting condition for the execution of the avoidance control.

A steering characteristic quantity Sch is obtained at a steering characteristic quantity obtaining calculation block SCH on the basis of the sensor signal(s) and/or the inner calculation value of other electronic control unit(s), which are obtained via the communication bus CB. The steering characteristic quantity Sch is a property indicating a degree of an oversteering tendency and/or a degree of an understeering tendency of the vehicle. The steering characteristic quantity Sch is calculated on the basis of a target turning quantity Jrt and an actual turning quantity Jra. More specifically, the steering characteristic quantity Sch (i.e. the property indicating the degree of the oversteering tendency or the degree of the understeering tendency of the vehicle) is calculated in a manner where the actual turning quantity Jra is compared with the target turning quantity Jrt. For example, firstly, a target yaw rate Yrt is calculated on the basis of the vehicle speed Vxa and a steering wheel angle θsw (or, a front wheel steering angle δfa) and then, a deviation ΔYr between the target yaw rate Yrt and an actual yaw rate Yra (i.e. ΔYr=Yra−Yrt, a yaw rate deviation) is calculated as the steering characteristic quantity Sch. The steering characteristic quantity Sch may be calculated as an interrelation between plural state quantities, instead of a single state quantity. For example, the steering characteristic quantity Sch may be calculated on the basis of an interrelation between a deviation Δβ between an actual side slip angle βa and a target side slip angle βt (i.e. Δβ=βa−βt, a side slip angle deviation) and the yaw rate deviation ΔYr (i.e. steering characteristic quantity Sch=K1*Δβ+K2*ΔYr, where K1 and K2 are coefficients). In a case where a side slip angle or a side slip angular velocity is used as the turning quantity, a target value of the side slip angle or the side slip angular velocity may be set as a constant (e.g. the target value of the side slip angle or the side slip angular velocity may be set as zero (0)). Therefore, in this case, the target turning quantity Jrt may be omitted from the calculation of the steering characteristic quantity Sch, and the steering characteristic quantity Sch may be calculated on the basis only of the actual turning quantity Jra.

More specifically, in the calculation of the steering characteristic quantity Sch, a steering characteristic quantity Sch_os indicating the degree of the oversteering tendency and a steering characteristic quantity Sch_us indicating the degree of the understeering tendency may be calculated on the basis of individual and separate calculation methods. For example, the steering characteristic quantity Sch_us may be calculated on the basis of the yaw rate deviation ΔYr and the steering characteristic quantity Sch_os may be calculated on the basis of the interrelation between the side slip angle and the side slip angular velocity.

The target quantity Spt (a positive value) (the target slip velocity Spt) is calculated at a stabilization control target quantity calculation block STD, which corresponds to the target slip velocity calculating means STD, on the basis of the steering characteristic quantity Sch. Firstly, a wheel (the target wheel) to which the brake torque is applied in order to execute the stabilization control is determined at a target wheel determination calculation block SWK on the basis of the steering characteristic quantity Sch. The wheel, which is selected by the target wheel determination calculation block SWK as a target to which the brake torque is applied in order to execute the stabilization control, is referred to as the target wheel (the selected wheel) WHs. Other wheel(s) out of four wheels (the front-right, the front-left, the rear-right and rear-left wheels) of the vehicle, which differs from the target wheel WHs, in other words, the wheel(s) that is (are) not selected as the target wheel, to which the brake torque is applied, by the target wheel determination calculation block SWK, is (are) referred to as the non-target wheel(s) (the non-selected wheel(s)) WHn. In the case where the steering characteristic quantity Sch indicates the oversteering tendency, a turning outer front wheel is determined as the target wheel. On the other hand, in the case where the steering characteristic quantity Sch indicates the understeering tendency, a turning inner rear wheel is determined as the target wheel. Then, the target quantity Spt** relative to the determined target wheel is determined on the basis of the steering characteristic quantity Sch (Sch_os, Sch_us).

In the case where the vehicle is in the oversteering tendency, the target quantity Spt is calculated by using a preliminarily set calculation map on the basis of the steering characteristic quantity Sch_os. The calculation map is set so as to have a characteristic in which, as indicated by a characteristic Chjo, the target quantity Spt is maintained at zero (0: non execution of the stabilization control), in a case where the steering characteristic quantity Sch_os is smaller than a predetermined value so1, the target quantity Spt is increased from zero (0) as the steering characteristic quantity Sch_os increases in a range between the characteristic Sch_os being equal to or grater than the predetermined value so1 and smaller than a predetermined value so2 and the target quantity Spt is maintained at a predetermined value eo1 (an upper limit value) in a case where the steering characteristic quantity Sch_os is equal to or greater than the predetermined value so2. Furthermore, the calculation map may be set so as to have a characteristic in which, as indicated by a characteristic Chso (indicated by an alternate long and short dash line), the target quantity Spt maintained at zero (0) in the case where the steering characteristic quantity Sch_os is smaller than the predetermined value so1 and the target quantity Spt is maintained at the predetermined value eo1 (the upper limit value) in a range where the steering characteristic quantity Sch_os is equal to or greater than the predetermined value so1. The target quantity Spt** is increased from zero (0), which indicates the non-execution of the control, when the steering characteristic quantity Sch_os reaches the predetermined value so1. Therefore, the predetermined value so1 serves as a start condition for executing the stabilization control (an oversteering restriction control).

On the other hand, in the case where the understeering tendency occurs at the vehicle, the target quantity Spt is calculated by using a preliminarily set calculation map on the basis of the steering characteristic quantity Sch_us. The calculation map is set so as to have a characteristic in which, as indicated by a characteristic Chju, the target quantity Spt is maintained at zero (0: non-execution of the stabilization control) in a case where the steering characteristic quantity Sch_us is smaller than a predetermined value su1, the target quantity Spt increases from zero (0) as the steering characteristic quantity Sch_us increases in a range where the steering characteristic quantity Sch_us being equal to or greater than the predetermined value su1 and smaller than a predetermined value su2, and the target quantity Spt is maintained at a predetermined value eu1 (an upper limit value) in a case where the steering characteristic quantity Sch_us is equal to or greater than the predetermined value su2. Furthermore, the calculation map may be set so as to have a characteristic in which, as indicated by a characteristic Chsu (indicated by a chain double-dashed line), the target quantity Spt is maintained at zero (0) in the case where the steering characteristic quantity Sch_us is smaller than the predetermined value su1 and the target quantity Spt is maintained at the predetermined value eu1 (the upper limit value) in a case where the steering characteristic quantity Sch_us is equal to or greater than the predetermined value su1. The target quantity Spt** is increased from zero (0), which indicates the non-execution of the control, when the steering characteristic quantity Sch_us reaches the predetermined value su1. Accordingly, the predetermined value su1 serves as a starting condition for executing the stabilization control (an understeering restriction control).

An actual wheel speed obtaining calculation block MWS obtains the actual speed Vw of each wheel WH as a turning speed. The actual wheel speed Vw** may be obtained on the basis of the sensor signal(s) and/or the inner calculation value of other electronic control unit(s), which are obtained via the communication bus CB.

The target quantity Gxt and the target quantity Spt are adjusted at a target quantity adjustment calculation block ATG in order to obtain the adjusted and final target quantity Pt. The target quantity adjustment calculation block ATG includes a non-target wheel calculation block NSW for calculating the target quantity Pt{n} of the non-target wheel WHn and a target wheel calculation block SLW for calculating the target quantity Pt{s} of the target wheel WHs.

The target quantity Pt{n} for the wheel, which is not selected by the target wheel determination calculation block SWK (i.e. the non-target wheel differing from the target wheel), is calculated at the non-target wheel calculation block NSW on the basis of the target quantity Gxt (the target deceleration). In other words, the target quantity Pt is calculated so as to have the same physical quantity as the target quantity Gxt (i.e. a dimension of "acceleration") at the non-target wheel calculation block NSW.

On the other hand, the target quantity Pt{s} for the target wheel, which is determined by the target wheel determination calculation block SWK as the target of the stabilization control, is calculated at the target wheel calculation block SLW on the basis of the actual speed $Vw\{n\}^{}$ of the non-target wheel and the target quantity $Spt^{}$ (the target slip velocity) of the target wheel. The target quantity $Pt\{s\}^{}$ is calculated at the target wheel calculation block SLW as a physical quantity in a dimension of "speed".

In the case where the stabilization control is not executed (i.e. sole execution of the avoidance control, $Spt^{}=0$), the target wheel does not exist and all wheels are determined as the non-target wheels WHn. In this case, the target quantity Gxt is outputted to the non-target wheels (all wheels) from the non-target wheel calculation block NSW as the target quantity $Pt\{n\}^{}$ (i.e. $Pt\{n\}^{**}=Gxt$).

On the other hand, in the case where the avoidance control is not executed (i.e. sole execution of the stabilization control, Gxt=0), the target quantity $Pt\{n\}^{}$ (=Gxt)=zero (0) is outputted to the non-target wheel WHn from the non-target wheel calculation block NSW. On the other hand, in this case, the target quantity $Pt\{s\}^{}=Spt\{s\}^{**}$ is outputted to the target wheel WHs from the target wheel calculation block SLW.

In the case where the avoidance control and the stabilization control are simultaneously executed (e.g. in a case where the stabilization control is started while the avoidance control is being executed), the target quantity $Pt\{n\}^{}$ of the non-target wheel is calculated at the non-target wheel calculation block NSW on the basis of the target quantity Gxt (i.e. $Pt\{n\}^{}=Gxt$). Then, the target quantity $Pt\{s\}$ of the target wheel is calculated at the target wheel calculation block SLW on the basis of the target quantity $Spt\{s\}^{}$ (the target slip velocity) of the target wheel and the actual quantity $Vw\{n\}^{}$ (the actual wheel speed) of the non-target wheel. More specifically, the target quantity $Pt\{s\}^{}$ of the target wheel is calculated as a value, which is obtained by subtracting the target quantity $Spt\{s\}^{}$ (the positive value) of the target wheel from the actual speed $Vw\{n\}^{}$ of the non-target wheel (i.e. $Pt\{s\}^{}=Vw\{n\}^{}-Spt\{s\}^{}$).

A braking force (a longitudinal force) of a pneumatic tire (the wheel) is generated due to the longitudinal slip (a difference between a traveling speed of the tire itself (i.e. the speed of the vehicle body) and a speed on a ground contact surface of the tire). The brake torque of the non-target wheel is controlled only by the target quantity Gxt of the avoidance control. The actual wheel speed $Vw\{n\}^{}$ of the non-target wheel includes a result of the supply of the brake torque executed only by the avoidance control. The target quantity corresponding to the brake torque of the target wheel WHs is determined in the manner where the target slip velocity $Spt\{s\}^{}$ is subtracted from the actual wheel speed $Vw\{n\}^{}$. Therefore, both the avoidance control and the stabilization control are reflected in the target wheel. Accordingly, the above-mentioned difference in the physical quantities between the target deceleration Gxt and the target slip velocity $Spt^{}$ is cleared.

The signal (the drive signal) for driving the braking means MBR is calculated at the driving means DRV on the basis of the adjusted target quantity $Pt^{}$. A servo control is executed in the control of the braking means MBR so that the actual quantity follows (corresponds to) the target quantity. Accordingly, the drive signal is calculated at the driving means DRV so that the actual wheel speed $Vw\{s\}^{}$ (the actual quantity) of the target wheel corresponds to the target quantity $Pt\{s\}^{}$. Furthermore, the drive signal is calculated so that the actual deceleration Gxa of the vehicle corresponds to the target quantity $Pt\{n\}^{}$. The actual deceleration Gxa (the actual acceleration speed) is obtained by a longitudinal acceleration sensor GX. Furthermore, the vehicle body speed is estimated on the basis of the detection result of the wheel speed sensor $WS^{**}$, so that the actual deceleration Gxa is calculated on the basis of the estimated vehicle body speed.

In a case where the brake actuator BR for controlling the brake hydraulic pressure as illustrated in FIG. 3 is adapted as the braking means MBR, signals Dr# and $Ds^{}$ are calculated as the drive signals. The signal Dr# is a signal for driving and controlling a pressure difference control valve SS# and the like. On the other hand, the signal $Ds^{}$ is a signal for driving and controlling a switching valve $SZ^{}$ and the like. The braking means MBR is controlled on the basis of the drive signals Dr# and $Ds^{}$, so that the brake hydraulic pressure is applied to the wheel cylinder $WC^{}$, thereby applying the brake torque to the wheel $WH^{}$. More specifically, an electric motor MT, a hydraulic pump OP# and the pressure difference control valve SS# are driven and controlled on the basis of the signal Dr#. On the other hand, the switching valve $SZ^{}$ (switching valves ZA, ZB, ZC and ZD) is controlled on the basis of the signal $Ds^{}$. Then, the hydraulic pressure of the wheel cylinder $WC^{}$ (wheel cylinders CA, CB, CC and CD) is controlled so that the brake torque corresponding to the target quantity $Pt^{}$ is applied to each wheel.

In the case where the avoidance control is executed but the stabilization control is not executed, an increase of the brake hydraulic pressure of the wheel cylinder $WC^{}$ (all of the wheel cylinders CA, CB, CC and CD) is instructed on the basis of the target quantity $Pt\{n\}^{}$ (=Gx). Then, the electric motor MT is driven on the basis of the signal Dr#, so that the brake fluid is discharged by the hydraulic pressure pump OP#. The brake hydraulic pressure is adjusted by the pressure difference control valve SS#, so that the hydraulic pressure at a hydraulic conduit LC# is increased to have a greater value than the hydraulic pressure at a hydraulic conduit LA# (=Pmc). The hydraulic pressure at all of the wheel cylinders $WC^{**}$ may be controlled to be the same level to each other in the avoidance control.

In the case where the execution of the stabilization control is started after the avoidance control is executed, a further increase of the brake hydraulic pressure of the wheel cylinder corresponding to the target wheel WHs (which will be hereinafter referred to as a target wheel cylinder WCs) is instructed on the basis of the target quantity $Pt\{s\}^{}$. More specifically, the pressure difference control valve SS# is controlled on the basis of the signal Dr#, so that the hydraulic pressure at the hydraulic conduit LC# including the target wheel WHs is increased so as to have a higher value (e.g. a hydraulic pressure for locking the wheel on a dry road surface) than the hydraulic pressure at the hydraulic conduit LC# not including the target wheel. On the other hand, the switching valve $SZ^{}$ is controlled on the basis of the signal $Ds^{}$, so that the hydraulic pressure at each wheel cylinder $WC^{}$ of the hydraulic conduit including the target wheel cylinder WCs is adjusted.

For example, when assuming that the wheel cylinder CC is determined as the target wheel cylinder WCs, which corresponds to the target wheel WHs, the hydraulic pressure at the hydraulic conduit LC2 is adjusted by the pressure difference control valve SS2 so as to exceed the hydraulic pressure (>Pmc) at the hydraulic conduit LC1. The hydraulic pressure at the hydraulic conduit LC2 is increased, but the increase of the hydraulic pressure at the wheel cylinder CD corresponding to the non-target wheel WHn, which is provided at the hydraulic conduit LC2 and which will be referred to as a non-target wheel cylinder WCn, is restricted because the switching valve ZD is turned to be in a communication interrupting state (i.e. a closed position). Furthermore, the switching valve ZC is repeatedly and alternately switched between a communication establishing state (an open position) and the communication interrupting state (the closed position) on the basis of the signal Ds**, so that the increase (i.e. an increasing gradient relative to time) of the hydraulic pressure at the wheel cylinder CC may be adjusted.

In the case where the brake actuator BR for controlling the brake hydraulic pressure as illustrated in FIG. 3 is adapted as the braking means MBR, the actual wheel speed of at least one of two wheels, which are connected to the hydraulic conduit not having the target wheel cylinder WCs, may be used as the actual wheel speed $Vw\{n\}^{}$ of the non-target wheel in the calculation of the target quantity $Pt\{s\}^{}$ of the target wheel.

Figure 8:
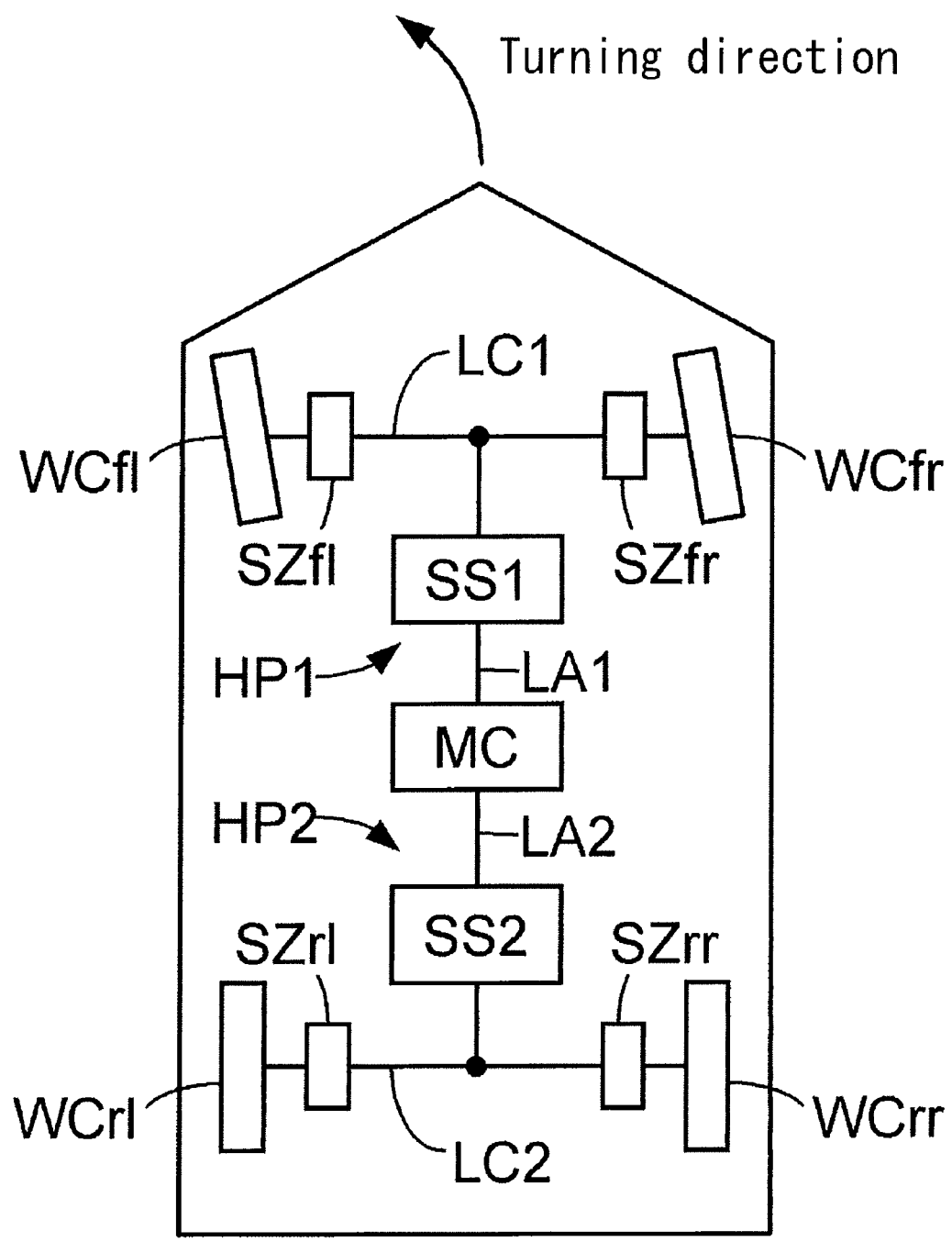
FIG. 8 is a diagram for explaining an operation performed by the motion control device for the vehicle having a front-rear split dual circuit system as a brake actuator according to the second embodiment.
Figure 9:
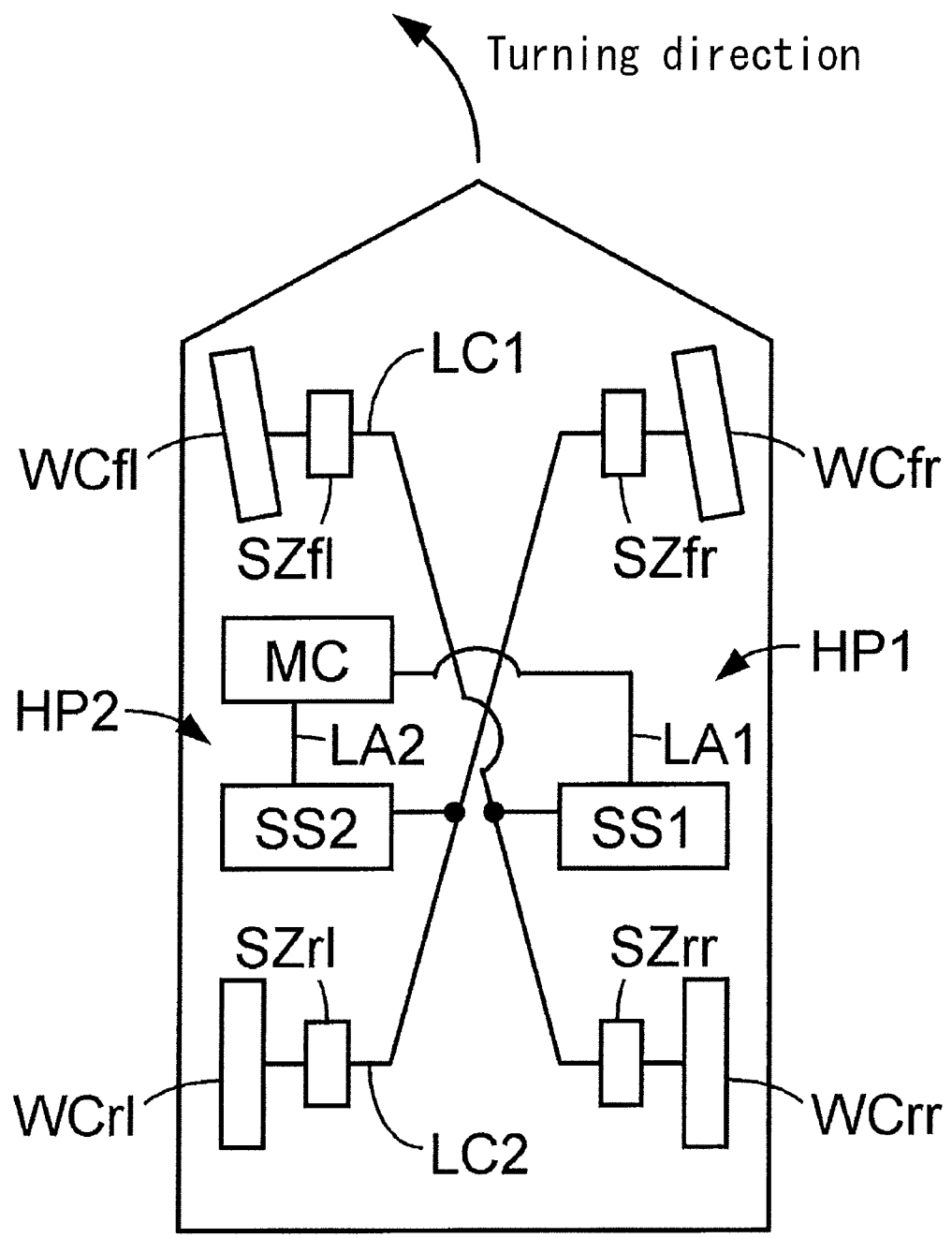
FIG. 9 is a diagram for explaining an operation performed by the motion control device for the vehicle having a diagonal split dual circuit system as the brake actuator according to the second embodiment.

An operation of the device according to the second embodiment in the case where a front-rear split dual circuit (a front-rear type circuit) is adapted as the brake actuator BR of the vehicle will be described below with reference to FIG. 8. The turning direction is supposed to correspond to a left turn. Therefore, a turning outer side corresponds to a right side of the vehicle relative to the traveling direction of the vehicle and a turning inner side corresponds to a left side of the vehicle relative to the traveling direction.

The symbols "**" added to the reference alphabets comprehensively indicate the wheels. More specifically, "fr" indicates the front-left wheel, "fr" indicates the front-right wheel, "rl" indicates the rear-left wheel and "rr" indicates the rear-right wheel. Furthermore, the symbol "#" added to the reference alphabet comprehensively indicates the first and second brake circuits. More specifically, "1" indicates a relation to the first brake circuit (the first circuit system) and "2" indicates a relation to the second brake circuit (the second circuit system). The reference alphabet in the brackets "{s}" indicates a relation to the target wheel (the wheel to which the brake torque is applied by the stabilization control). On the other hand, the reference alphabet in the brackets "{n}" indicates a relation to the non-target wheel (the wheel to which the brake torque is not applied by the stabilization control).

In the case where the avoidance control is executed solely (i.e. in the case where the stabilization control is not executed and the avoidance control is executed), the target quantity Gxt is outputted as the target quantity $Pt\{n\}^{}$. Then, the signal Dr# is calculated on the basis of the target quantity $Pt\{n\}^{}$. The pressure difference control valve SS#, which is provided at the hydraulic conduit LC#, is controlled on the basis of the signal Dr#. More specifically, the pressure difference control valve SS# is controlled so that the pressure difference between the hydraulic conduit LA# and the hydraulic conduit LC# is continuously adjusted by the pressure difference control valve SS# in order to adjust the brake hydraulic pressure at the hydraulic conduit LC# to have a higher pressure than the brake hydraulic pressure at the hydraulic conduit LA# (the master cylinder pressure Pmc). In this case, all of the switching valves SZ are turned to be in the communication establishing state (a non-electrified state), so that all of the wheel cylinders WC are controlled so as to have the same hydraulic pressure with each other.

In a case where the execution of the stabilization control is started while the avoidance control is being executed, so that the stabilization control and the avoidance control are simultaneously executed, and where the steering characteristic quantity Sch indicates the oversteering tendency of the vehicle, the front-right wheel WHfr, which is the turning outer front wheel, is determined as the target wheel WHs. Then, the wheel cylinder WCfr is determined as the target wheel cylinder WCs (the wheel cylinder corresponding to the target wheel). The hydraulic conduit LC1 is determined as the hydraulic conduit including the target wheel cylinder WCfr and the hydraulic conduit LC2 is determined as the hydraulic conduit not including the target wheel cylinder WCfr. Then, the hydraulic pressure at the hydraulic conduit LC2 is adjusted by the pressure difference control valve SS2, which is controlled on the basis of the target quantity $Pt\{n\}^{**}$ (=Gxt). More specifically, the hydraulic pressure at the hydraulic conduit LC2 is adjusted so as to have a higher value than the hydraulic pressure at the hydraulic conduit LA2 (the master cylinder pressure Pmc). In this case, the switching valves SZrl and SZrr provided at the hydraulic conduit LC2 are controlled to be in the communication establishing state (i.e. the valve position of each of the switching valves SZrl and SZrr is controlled to be the open position), so that the hydraulic pressure at the wheel cylinder WCrl and the hydraulic pressure at the wheel cylinder WCrr become the same level as the hydraulic pressure at the hydraulic conduit LC2.

The target quantity $Pt\{s\}^{}$ of the target wheel is calculated on the basis of the target slip velocity $Spt\{s\}^{}$ of the target wheel and the actual wheel speed $Vw\{n\}^{}$ of the non-target wheel. For example, the target quantity $Pt\{s\}^{}$ may be determined in the manner where the target slip velocity $Spt\{s\}^{}$ is subtracted from the actual wheel speed $Vw\{n\}^{}$. The actual wheel speed of at least one of the wheels WHrl and WHrr corresponding to the hydraulic conduit LC2, which does not include the target wheel cylinder WCfr, (i.e. at least one of the actual wheel speed $Vw\{n\}$rl and the actual wheel speed $Vw\{n\}$rr) may be used as the actual wheel speed $Vw\{n\}^{**}$ of the non-target wheel.

The brake torque by the avoidance control is reflected in the actual speed $Vw\{n\}$rl and the actual speed $Vw\{n\}$rr of the corresponding wheels, which are provided at the hydraulic brake circuit system not including the target wheel WHs. Therefore, because the target quantity $Pt\{s\}^{**}$ is calculated on the basis of at least one of the actual speed $Vw\{n\}$rl and the actual speed $Vw\{n\}$rr, the control, in which both the avoidance control and the stabilization control are taken into consideration, may be executed.

The hydraulic pressure at the hydraulic conduit LC1 is adjusted by the pressure difference control valve SS1, which is controlled on the basis of the target quantity $Pt\{s\}$fr. More specifically, the hydraulic pressure at the hydraulic conduit LC1 is controlled so as to have a higher pressure than the hydraulic pressure at the hydraulic conduit LC2. The switching valve SZfl, which is provided at the hydraulic conduit LC1 having the target wheel cylinder WCfr and which corresponds to the non-target wheel cylinder WCfl (the wheel cylinder of the non-target wheel), may be controlled to be in the communication interrupting state (the valve position of the switching valve SZfl is controlled to the closed position) when the stabilization control is started. Accordingly, the hydraulic pressure of the wheel cylinder WCfl may be maintained at the same level as the hydraulic pressure thereof before the stabilization control is executed.

The hydraulic pressure of the wheel cylinder WCfr, which is provided at the turning outer front wheel (the target wheel), is increased while ensuring the hydraulic pressure by the avoidance control. Therefore, the vehicle deceleration by the avoidance control is ensured, which may further result in restricting the oversteering tendency of the vehicle because of deduction in a right-left difference in front wheel braking forces and a front wheel cornering force.

The pressure difference control valve SS1 is controlled on the basis of the target quantity $Pt\{s\}$fr, so that the hydraulic pressure at the hydraulic conduit LC1 may be increased up to a preliminarily set sufficiently great hydraulic pressure level (i.e. a brake hydraulic pressure sufficient enough to lock the wheel on a dry asphalt road surface, a lock hydraulic pressure). The hydraulic pressure of the target wheel cylinder WCfr is adjusted by the switching valve SZfr, which is controlled on the basis of the target quantity Pt{s}fr. In this case, the switching valve SZfr is alternately switched between the communication establishing state and the communication interrupting state, in other words, a so-called pulse pressure increase is executed.

Generally, a high responsiveness in the hydraulic pressure is required for the stabilization control when comparing to the avoidance control. However, according to the embodiment, even in a case where the turning direction is changed, such as in a case where a slalom steering operation is performed (i.e. in a case where the target wheel cylinder changes), a high responsiveness in the hydraulic pressure is ensured because the preliminarily set high hydraulic pressure (the lock hydraulic pressure) is ensured and the target wheel cylinder is adjusted by the switching valve SZ** on the basis of the preliminarily set high hydraulic pressure.

In a case where the execution of the stabilization control is started while the avoidance control is being executed, so that the avoidance control and the stabilization control are simultaneously executed, and where the steering characteristic quantity Sch indicates the understeering tendency, the rear-left wheel WHrl, which is the turning inner rear wheel, is determined as the target wheel WHs. Then, the wheel cylinder WCrl is determined as the target wheel cylinder WCs. The hydraulic conduit LC2 is determined as the hydraulic conduit including the target wheel cylinder WCrl and the hydraulic conduit LC1 is determined as the hydraulic conduit not including the target wheel cylinder WCrl. The hydraulic pressure at the hydraulic conduit LC1 is adjusted by the pressure difference control valve SS1, which is controlled on the basis of the target quantity Pt{n}** (=Gxt). More specifically, the hydraulic pressure at the hydraulic conduit LC1 is adjusted so as to exceed the hydraulic pressure at the hydraulic conduit LA1. In this case, each of the switching valves SZfl and SZfr, which are provided at the hydraulic conduit LC1, is controlled to be in the communication establishing state, so that the hydraulic pressure of the wheel cylinder WCfl and the hydraulic pressure of the wheel cylinder WCfr are controlled to be the same level as the hydraulic pressure at the hydraulic conduit LC1.

The target quantity Pt{s} of the target wheel is calculated on the basis of the target slip velocity Spt{s} of the target wheel and the actual wheel speed Vw{n} of the non-target wheel. For example, the target quantity Pt{s} is determined in the manner where the target slip velocity Spt{s} is subtracted from the actual wheel speed Vw{n}. The actual wheel speed of at least one of the wheels WHfl and WHfr corresponding to the hydraulic conduit LC1 not including the target wheel cylinder WCrl (i.e. at least one of the actual wheel speed Vw{n}fl and the actual wheel speed Vw{n}fr) may be used as the actual wheel speed Vw{n}** of the non-target wheel.

As is the case where the oversteering tendency occurs, the brake torque by the avoidance control is reflected in the actual speed Vw{n}fl and the actual speed Vw{s}fr of the corresponding wheels, which are connected to the hydraulic brake circuit system not having the target wheel WHs. Therefore, because the target quantity Pt{n}** is calculated on the basis of at least one of the actual wheel speed Vw{n}fl and the actual wheel speed Vw{s}fr, the control in which both of the avoidance control and the stabilization control are taken into consideration may be executed.

The hydraulic pressure at the hydraulic conduit LC2 is adjusted by the pressure difference control valve SS2, which is controlled on the basis of the target quantity Pt{s}rl. More specifically, the hydraulic pressure at the hydraulic conduit LC2 is controlled to have a higher value than the hydraulic pressure at the hydraulic conduit LC1. The switching valve SZrr, which is provided at the hydraulic conduit LC2 including the target wheel cylinder WCrl and which corresponds to the non-target wheel cylinder WCrr, is controlled to be in the communication interrupting state (the closed position) when the stabilization control is started. Accordingly, the hydraulic pressure of the wheel cylinder WCrr may be maintained to be the same level as the hydraulic pressure thereof immediately before the execution of the stabilization control is started.

Only the hydraulic pressure of the wheel cylinder WCrl, which is provided at the turning inner rear wheel (the target wheel), is increased while ensuring the hydraulic pressure by the avoidance control. Therefore, the vehicle deceleration by the avoidance control is ensured, which may further result in reduction of the understeering tendency because of the reduction in a right-left difference in the rear wheel braking force and a rear wheel cornering force.

The pressure difference control valve SS2 is controlled on the basis of the target quantity Pt{s}rl, so that the hydraulic pressure at the hydraulic conduit LC2 may be increased up to the preliminarily set lock hydraulic pressure. The hydraulic pressure of the target wheel cylinder WCrl is adjusted by the switching valve SZrl, which is controlled on the basis of the target quantity Pt{s}rl. In this case, the switching valve SZrl is alternately switched between the communication establishing state and the communication interrupting state, so that the so-called pulse pressure increase is executed.

As is the case with the above-mentioned oversteering tendency, the relatively high responsiveness in the hydraulic pressure is required for the stabilization control when comparing to the avoidance control. However, because the high hydraulic pressure (the lock hydraulic pressure) is preliminarily ensured and the hydraulic pressure is adjusted by the switching valve SZ** on the basis of the preliminarily set high hydraulic pressure, even in the case where the turning direction changes (i.e. even in the case where the target wheel cylinder is switched), the high responsiveness in the hydraulic pressure may be ensured.

An operation of the device according to the second embodiment, which is provided at the vehicle having a diagonal split dual circuit (a diagonal circuit system) as the brake actuator BR, will be described below with reference to FIG. 6. As is the case with the front-rear split dual circuit, it is supposed that the turning direction indicates the left turn.

In the case where the execution of the stabilization control is started while the avoidance control is being executed, so that the avoidance control and the stabilization control are simultaneously executed, and where the steering characteristic quantity Sch indicates the oversteering tendency, the wheel cylinder WCfr of the front-right wheel (the turning outer front wheel out of the target wheels) is determined as the target wheel cylinder WCs. Accordingly, the hydraulic conduit LC2 is determined as the hydraulic conduit including the target wheel cylinder WCfr and the hydraulic conduit LC1 is determined as the hydraulic conduit not including the target wheel cylinder WCfr. The hydraulic pressure at the hydraulic conduit LC1 is adjusted by the pressure difference control valve SS1, which is controlled on the basis of the target quantity Pt{n}** (=Gxt). More specifically, the hydraulic pressure at the hydraulic conduit LC1 is adjusted so as to exceed the hydraulic pressure at the hydraulic conduit LA1 (=Pmc). In this case, each of the switching valves SZfl and SZrr, which are provided at the hydraulic conduit LC1, is controlled to be in the communication establishing state (the open position), so that the hydraulic pressure of the wheel cylinder WCfl and the hydraulic pressure of the wheel cylinder WCrr are controlled to be the same level as the hydraulic pressure at the hydraulic conduit LC1.

The target quantity Pt{s} of the target wheel is calculated on the basis of the target slip velocity Spt{s} of the target wheel and the actual wheel speed Vw{n} of the non-target wheel. For example, the target quantity Pt{s} is determined in the manner where the target slip velocity Spt{s} is subtracted from the actual wheel speed Vw{n}. The actual wheel speed of at least one of the wheels WHfl and WHrr, which correspond to the hydraulic conduit LC1 not including the target wheel cylinder WCfr, (i.e. at least one of the actual wheel speed Vw{n}fl and the actual wheel speed Vw{n}rr) may be used as the actual wheel speed Vw{n}** of the non-target wheel.

As is the case with the above-mentioned case, the brake torque by the avoidance control is reflected in the actual speed Vw{n}fl and the actual speed Vw{n}rr of the corresponding wheels, which are provided at the hydraulic brake circuit system not including the target wheel WHs. Accordingly, because the target quantity Pt{s}** is calculated on the basis of at least one of the actual wheel speed Vw{n}fl and the actual wheel speed Vw{n}rr, the control in which both of the avoidance control and the stabilization control are taken into consideration may be executed.

The hydraulic pressure at the hydraulic conduit LC2 is adjusted by the pressure difference control valve SS2, which is controlled on the basis of the target quantity Pt{s}fr. More specifically, the hydraulic pressure at the hydraulic conduit LC2 is controlled so as to exceed the hydraulic pressure at the hydraulic conduit LC1. The switching valve SZrl corresponding to the non-target wheel cylinder WCrl is controlled to be in the communication interrupting state (the closed position) when the stabilization control is started, so that the hydraulic pressure of the wheel cylinder WCrl is maintained at the same level as the pressure reached immediately before the stabilization control is started. On the other hand, the switching valve SZfr is controlled to be in the communication establishing state (the open position), so that the hydraulic pressure of the wheel cylinder WCfr is maintained to be the same level as the hydraulic pressure at the hydraulic conduit LC2.

The hydraulic pressure of the wheel cylinder WCfr, which is provided at the turning outer front wheel, is increased while ensuring the brake hydraulic pressure by the avoidance control. Therefore, the vehicle deceleration by the avoidance control is ensured, which may further result in reducing the oversteering tendency of the vehicle because of the reduction in the right-left difference in the front wheel braking force and the front wheel cornering force.

The pressure difference control valve SS2 is controlled on the basis of the target quantity Pt{s}fr, so that the hydraulic pressure at the hydraulic conduit LC2 is increased up to the preliminarily set sufficiently high hydraulic pressure (the lock hydraulic pressure). The hydraulic pressure of the target wheel cylinder WCfr is adjusted by the switching value SZfr, which is controlled on the basis of the target quantity Pt{s}fr. In this case, the switching valve SZfr is alternately switched between the communication establishing state and the communication interrupting state, so that the so-called pulse pressure increase is executed.

As is described above, the high responsiveness in the hydraulic pressure, which is required in the case where the turning direction changes and the like, may be ensured.

In the case where the execution of the stabilization control is started while the avoidance control is being executed, so that the avoidance control and the stabilization control are simultaneously executed, and where the steering characteristic quantity Sch indicates the understeering tendency, the wheel cylinder WCrl of the rear-left wheel (the turning inner rear wheel out of the target wheels) is determined as the target wheel cylinder WCs. The hydraulic conduit LC2 is determined as the hydraulic conduit including the target wheel cylinder WCrl and the hydraulic conduit LC1 is determined as the hydraulic conduit not including the target wheel cylinder WCrl. The hydraulic pressure at the hydraulic conduit LC1 is adjusted by the pressure difference control valve SS1, which is controlled on the basis of the target quantity Pt{n}** (=Gxt). More specifically, the hydraulic pressure at the hydraulic conduit LC1 is adjusted so as to exceed the hydraulic pressure at the hydraulic conduit LA1. In this case, each of the switching valves SZrl and SZrr, which are provided at the hydraulic conduit LC1, is controlled to be in the communication establishing state (the open position), so that the hydraulic pressure of the wheel cylinder WCfl and the hydraulic pressure of the wheel cylinder WCrr are maintained to be the same level as the hydraulic pressure at the hydraulic conduit LC1.

The target quantity Pt{s} of the target wheel is calculated on the basis of the target slip velocity Spt{s} of the target wheel and the actual wheel speed Vw{n} of the non-target wheel. For example, the target quantity Pt{s} is determined in the manner where the target slip velocity Spt{s} is subtracted from the actual wheel speed Vw{n}. The actual wheel speed of at least one of the wheels WHfl and WHrr, which correspond to the hydraulic conduit LC1 not including the target wheel cylinder WCrl, (i.e. at least one of the actual wheel speed Vw{n}fl and the actual wheel speed Vw{n}rr) may be used as the actual wheel speed Vw{n}** of the non-target wheel.

As is the case with the above-mentioned case, the brake torque by the avoidance control is reflected in the actual speed Vw{n}fl and the actual speed Vw{n}rr of the corresponding wheels, which are provided at the hydraulic brake circuit system not including the target wheel WHs. Accordingly, because the target quantity Pt{s}** is calculated on the basis of at least one of the actual wheel speed Vw{n}fl and the actual wheel speed Vw{n}rr, the control in which both of the avoidance control and the stabilization control are taken into consideration may be executed.

The hydraulic pressure at the hydraulic conduit LC2 is adjusted by the pressure difference control valve SS2, which is controlled on the basis of the target quantity Pt{s}rl. More specifically, the hydraulic pressure at the hydraulic conduit LC2 is controlled so as to exceed the hydraulic pressure at the hydraulic conduit LC1. Furthermore, the switching valve SZfr corresponding to the non-target wheel cylinder WCfr is controlled to be in the communication interrupting state (the closed position) when the stabilization control is started, so that the hydraulic pressure of the wheel cylinder WCfr is maintained at the same level as the hydraulic pressure reached immediately before the stabilization control is started. On the other hand, the switching valve SZrl is controlled to be in the communication establishing state (the open position), so that the hydraulic pressure of the wheel cylinder WCrl is maintained at the same level as the hydraulic pressure at the hydraulic conduit LC2.

The hydraulic pressure of the wheel cylinder WCrl, which is provided at the turning inner rear wheel, is increased while ensuring the brake hydraulic pressure by the avoidance control. Therefore, the vehicle deceleration by the avoidance control is ensured, which may further result in reducing the understeering tendency of the vehicle because of the reduction in the right-left difference in the rear wheel braking force and the turning inner rear wheel cornering force.

The pressure difference control valve SS2 is controlled on the basis of the target quantity Pt{s}rl, so that the hydraulic pressure at the hydraulic conduit LC2 is increased up to the preliminarily set sufficiently high hydraulic pressure (the lock hydraulic pressure). The hydraulic pressure of the target wheel cylinder WCrl is adjusted by the switching valve SZrl, which is controlled on the basis of the target quantity Pr{s}rl. More specifically, the switching valve SZrl is alternately switched between the communication establishing state and the communication interrupting state, so that the so-called pulse pressure increase is executed.

As mentioned above, the high responsiveness in the hydraulic pressure, which is required in the case where the turning direction changes and the like, may be ensured.

Advantages and merits of the device according to the second embodiment will be described below with reference to FIG. 10.

It is supposed that the avoidance control is started on the basis of the emergency state quantity Kq at time t0 In this case, the brake torque of each wheel is increased up to a value q1 in response to the target deceleration Gxt, which is calculated on the basis of the emergency state quantity Kq. The vehicle is decelerated by the brake torque q1. Accordingly, the emergency state of the vehicle may be avoided.

Then, the execution of the stabilization control is started on the basis of the steering characteristic quantity Sch at time t2, so that the avoidance control and the stabilization control are simultaneously executed. The brake torque of the non-target wheel (the wheel to which the brake torque by the stabilization control is not applied) is controlled on the basis of the target deceleration Gxt. Therefore, the brake torque of the non-target wheel is maintained at the value q1. The brake torque of the target wheel (the wheel to which the brake torque is applied by the stabilization control) is controlled on the basis of the target slip velocity Spt{s} of the target wheel and the actual wheel speed Vw{n} of the non-target wheel. The actual wheel speed Vw{n} of the non-target wheel includes the longitudinal slip, which occurs due to the supply of the brake torque thereto by the avoidance control. As indicated by a waveform Pws, the brake torque of the target wheel is further increased by the brake torque (a value e1) generated by the stabilization control from the value q1, so that the brake torque of the target wheel reaches a value s1. The target quantity Pt{s} of the target wheel may be calculated in the manner where the target slip velocity Spt{s} of the target wheel is subtracted from the actual wheel speed Vw{n} of the non-target wheel.

The brake torque by the avoidance control is reflected in the actual wheel speed of the non-target wheel. More specifically, the brake hydraulic pressure by the stabilization control is further increased while the brake hydraulic pressure by the avoidance control is ensured in a manner where the brake hydraulic pressure of the target wheel is controlled on the basis of the target slip velocity of the target wheel and the actual wheel speed of the non-target wheel. Therefore, the interference in the control between the avoidance control and the stabilization control is avoided, while ensuring a sufficient deceleration of the vehicle, thereby maintaining the stability of the vehicle. Furthermore, because the influence of the avoidance control is taken into consideration on the basis of the wheel speed of the non-target wheel, the hydraulic pressure sensor and the like does not need to be provided at each wheel, which may result in simplifying the configuration of the brake actuator.

A brake-by-wire configuration, which includes two hydraulic circuits (brake conduits) that are hydraulically separated, may be adapted to the brake actuator BR. In this case, the master cylinder MC is removed from a brake apparatus including the brake actuator BR and a brake simulator is provided at the brake apparatus instead of the master cylinder MC. In the case where the brake control is not executed, each liner control valve, which is provided at each hydraulic brake circuit system, is controlled on the basis of an operation quantity Bs of a brake operating member BP, which is detected by a brake operation sensor BS. The switching valve SZ is provided between each of two linear control valve on the one hand and each wheel cylinder WC on the other hand.

In the case where the execution of the stabilization control is started while the avoidance control is being executed, as is the case with the above-mentioned case, the hydraulic pressure at the hydraulic conduit not including the target wheel cylinder is adjusted by the linear control valve, which is controlled on the basis of the target deceleration Gxt. On the other hand, the hydraulic pressure at the hydraulic conduit including the target wheel cylinder is adjusted by the linear control valve, which is controlled on the basis of the target quantity Pt{s}**, so that the hydraulic pressure at the hydraulic conduit including the target wheel cylinder becomes higher than the hydraulic pressure at the hydraulic conduit not including the target wheel cylinder.

The switching valve SZ corresponding to the non-target wheel, which is provided at the hydraulic conduit including the target wheel cylinder, is controlled to be in the communication interrupting state when the stabilization control is started. The hydraulic pressure at the hydraulic conduit including the target wheel is increased up to the preliminarily set sufficiently high pressure (the lock hydraulic pressure) when the execution of the stabilization control is started. On the other hand, the switching valve SZ corresponding to the target wheel cylinder is controlled, so that the hydraulic pressure of the target wheel cylinder WCs may be increased in a pulse pressure increase manner.

In the above description, the target deceleration, which serves as the target quantity for the avoidance control, is determined as the deceleration of the vehicle (the vehicle body). However, the target deceleration may be calculated as a target deceleration dVt of the wheel. In this case, the servo control is executed by the driving means DRV so that the target deceleration dVt of the wheel corresponds to an actual deceleration dVa of the corresponding wheel. The actual deceleration dVa of the wheel may be calculated on the basis of the detection result Vw of the wheel speed sensor WS.

In the case where the avoidance control and the stabilization control are simultaneously executed (e.g. in the case where the stabilization control is started while the avoidance control is being executed), the braking means MBR of the wheel, which is not selected as a control target of the stabilization control (i.e. the non-target wheel), is controlled by the brake control means MBC on the basis of the target quantity (a first target quantity) for the avoidance control. On the other hand, the braking means MBR of the wheel, which is selected as the control target of the stabilization control (i.e. the target wheel), is controlled by the brake control means MBC on the basis of the target quantity (the first target quantity) for the avoidance control and the target quantity (the second target quantity) for the stabilization control. Accordingly, the yawing moment of the vehicle may be appropriately controlled by the stabilization control, while ensuring the vehicle deceleration by the avoidance control. Therefore, a motion of the vehicle (the deceleration, the yawing and the like) may be smoothened when comparing to a case where the control is simply switched from the avoidance control to the stabilization control.

A difference may occur between the target quantity and the actual quantity in a case where a feedback control is executed. However, according to the first embodiment, because the stabilization control is executed in view of the first actual quantity of the non-target wheel (the actual quantity used for the avoidance control relative to the wheel to which the stabilization control is not executed), the influence of the difference between the target quantity and the actual quantity may be compensated.

According to the second embodiment, the brake control means MBC controls the brake torque to be applied to the target wheel on the basis of the value, which is obtained by subtracting the target slip velocity Spt** corresponding to the target wheel from the actual speed of the wheel corresponding to the non-target wheel.

Generally, an appropriate control target for the emergency avoidance control (the avoidance control) differs from an appropriate control target for the vehicle stabilization control (the stabilization control). Therefore, according to the second embodiment, the brake torque of the wheel, which is not selected as the target of the supply of the brake torque by the stabilization control (i.e. the non-target wheel), is controlled on the basis of the target deceleration (i.e. the target deceleration of the vehicle body or the wheel), which serves as the target of the avoidance control. On the other hand, the brake torque of the wheel, which is selected as the target of the supply of the brake torque by the stabilization control (i.e. the target wheel), is controlled on the basis of the target slip velocity (the target quantity of the stabilization control) of the target wheel and the actual speed (the actual wheel speed) of the non-target wheel. Accordingly, the control quantity by the avoidance control is reflected in the actual wheel speed of the non-target wheel. According to the second embodiment, because the stabilization control is executed on the basis of the wheel speed of the non-target wheel and the target slip velocity of the target wheel, the stability of the vehicle may be maintained while ensuring the sufficient deceleration of the vehicle by the avoidance control. Furthermore, because the control quantity of the avoidance control is determined on the basis of the actual wheel speed of the non-target wheel, an additional sensor (e.g. the brake hydraulic pressure sensor, the brake torque sensor and the like) does not need to be provided at each wheel, which may result in simplifying the brake configuration.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A motion control device for a vehicle, comprising:
a braking means for applying a brake torque to each of a plurality of wheels of the vehicle;
an avoidance control means for calculating a first target quantity and a first actual quantity, which are used for an avoidance control for applying the brake torque to each of the plurality of the wheels via the braking means in order to avoid an emergency state of the vehicle in which a collision of the vehicle against a forward obstacle occurs, each of the first target quantity and the first actual quantity corresponding to the brake torque;
a stabilization control means for determining a target wheel out of the plurality of the wheels as a target of a supply of the brake torque and calculating a second target quantity used for a stabilization control for applying the brake torque to the target wheel via the braking means in order to ensure a stability of the vehicle, the second target quantity corresponding to the brake torque; and
a brake control means for calculating the brake torque to be applied to a non-target wheel, which differs from the target wheel, on the basis of the first target quantity corresponding to the non-target wheel and calculating the brake torque to be applied to the target wheel on the basis of a target quantity which is obtained by adding the first actual quantity corresponding to the non-target wheel and the second target quantity corresponding to the target wheel in a case where the stabilization control means performs the stabilization control after the avoidance control means performs the avoidance control.

* * * * *